June 16, 1964 N. H. DIETER, JR Re. 25,597
SOUND RECORD TRANSDUCING DEVICES FOR STEREOPHONIC AND LIKE RECORDS
Original Filed June 9, 1958 7 Sheets-Sheet 1
FIG. 1
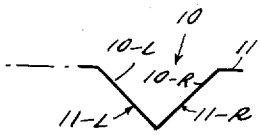
FIG. 2A
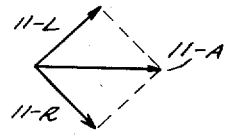
FIG. 2B
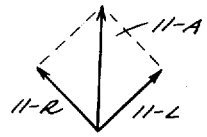
FIG. 2C
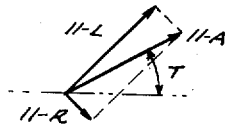
FIG. 2AA
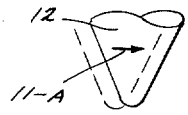
FIG. 2BB
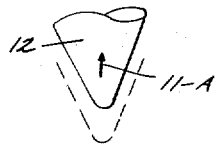
FIG. 2CC
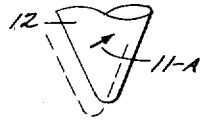
FIG. 3
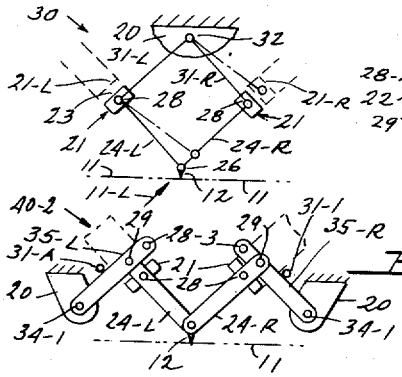
FIG. 4
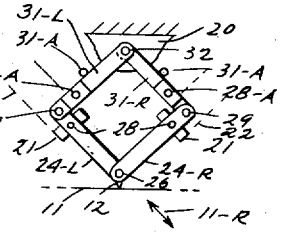
FIG. 5
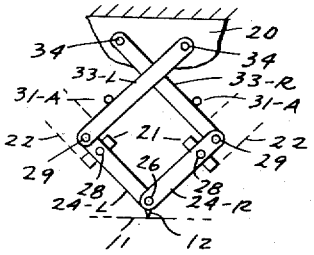
FIG. 6
FIG. 7
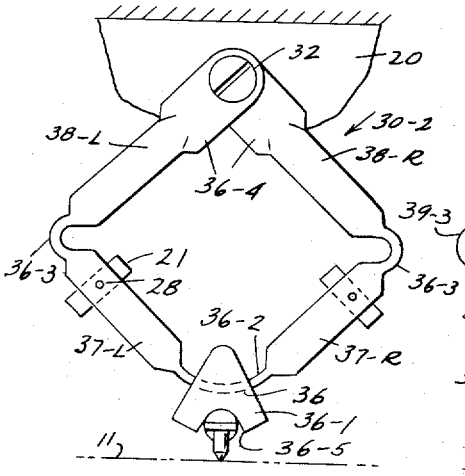
FIG. 8
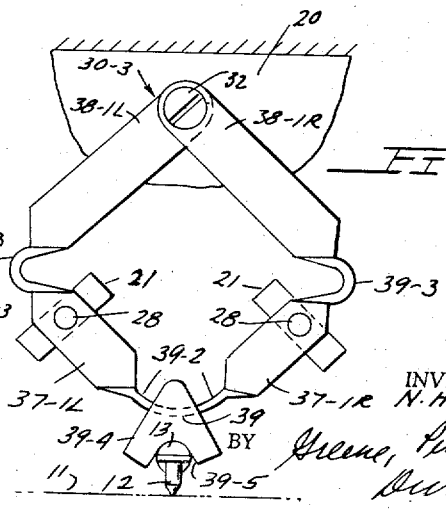
INVENTOR.
N. H. DIETER JR.
BY Greene, Finlay & Durr
ATTORNEYS June 16, 1964

N. H. DIETER, JR

SOUND RECORD TRANSDUCING DEVICES FOR STEREOPHONIC AND LIKE RECORDS

Re. 25,597

Original Filed June 9, 1958

7 Sheets-Sheet 2

INVENTOR.
N. H. DIETER, JR.

BY Greene, Pinder & Durr
ATTORNEYS

INVENTOR.
N. H. DIETER, JR.
BY Greene, Finnegan & Dunn
ATTORNEYS

June 16, 1964 N. H. DIETER, JR Re. 25,597

SOUND RECORD TRANSDUCING DEVICES FOR STEREOPHONIC AND LIKE RECORDS

Original Filed June 9, 1958 7 Sheets-Sheet 4

INVENTOR.
N. H. DIETER, JR.

BY Greene, Pineles & Durr

ATTORNEYS

INVENTOR.
N. H. DIETER, JR.

BY Greene, Pincus & Durr
ATTORNEYS

INVENTOR
N. H. DIETER, JR.

BY Grelle, Pineles & Durr
ATTORNEYS

INVENTOR
N. H. DIETER, JR.

BY Greene, Pieles & Durr
ATTORNEYS

United States Patent Office

Re. 25,597
Reissued June 16, 1964

25,597

SOUND RECORD TRANSDUCING DEVICES FOR STEREOPHONIC AND LIKE RECORDS

Norman H. Dieter, Jr., Pleasantville, N.Y., assignor to Sonotone Corporation, Elmsford, N.Y., a corporation of New York Original No. 2,934,610, dated Apr. 26, 1960, Ser. No. 740,760, June 9, 1958. Application for reissue May 8, 1962, Ser. No. 193,678
10 Claims. (Cl. 179—100.41)

Matter enclosed in heavy brackets [ ] appears in the original patent but forms no part of this reissue specification; matter printed in italics indicates the additions made by reissue.

This invention relates to sound-recording and reproducing devices, and particularly to devices of the type used for making stereophonic records and playing back stereophonic records from two faces of a record groove of the type present in generally used disc records. Although the invention will be described in detail in connection with recording and playing back of two related stereophonic record sequences, it should be understood that it is suitable for recording and playing back any other type of related sound sequences on two surface portions or faces of a single record groove formed on the surface of either a disc record or of records having other shapes. Although it is applicable to recording and reproducing records wherein lateral and vertical groove undulations of a single record groove represent two stereophonically related record sequences, the invention has been evolved and will be described herein in connection with the standard stereophonic disc record system as adopted by the record industry and known as the "45–45" record system, which is also described in Keller et al. Patent No. 2,114,471.

In such "45–45" groove record system, the two recorded signal sequences are represented by two angularly disposed side faces of a record groove, each face being inclined 45° to the horizontal and being disposed perpendicularly or 90° to each other. The two 90° inclined opposite groove faces of such record system are produced and are played back with a single stylus of a record transducing device having two mechano-electric signal transducing elements or units which are each connected through two driving links to their common stylus, as described, for instance, in said Keller et al. patent. In such record-transducing device operating with a 45–45 record disc groove, each driving link is intended to transmit motion to or from the stylus at an angle perpendicular to one of the 45° inclined groove faces, in a direction 90° displaced from a similar motion of the stylus relative to the other groove face. In prior record-transducing devices of this type, each drive link has a pivotal connection to the common stylus and to their respective signal transducing units, and the stylus had to be provided with an additional resilient restraining and stabilizing support. However, such stylus restraining and stabilizing support introduces objectionable coupling between the motions of the two 90° displaced stylus links.

Although not limited thereto, it is among the objects of the invention to provide a record-transducing device suitable for recording or playing back stereophonic records with 45–45 record grooves, in which the objectionable coupling between the motions of the stylus drive links is materially reduced or suppressed. It is also among the objects of the invention to provide such record-transducing device which is of simplified construction, and which may be assembled by simple operations.

The present invention is based on the discovery that by providing each of the two stylus links through which the single stylus is connected to two transducing units of a stereophonic-type pickup with an additional guide link pivotally connected to the respective drive link, it is possible to provide a high order of de-coupling of the two 90° displaced stylus link motions, not possible with prior pickups of this type.

The foregoing and other objects of the invention will be best understood from the following description of exemplifications of the invention, reference being had to the accompanying drawings, wherein:

FIG. 1 is an explanatory enlarged diagrammatic view of a record groove of a standard stereophonic disc record;

FIG. 2–A is a vector diagram of the cutting forces applied to the faces of the record groove when a stereophonic cutter forms a laterally cut groove and also of the stereophonic output signals when playing back such laterally cut groove with a stereophonic pickup;

FIG. 2–AA indicates diagrammatically the lateral motion of the stylus when making or playing back a laterally cut groove in accordance with the diagram of FIG. 2–A;

FIG. 2–B is a vector diagram of the cutting forces applied to the faces of the record groove when a stereophonic cutter transducer forms a vertically cut groove and also of the stereophonic output signals when playing back such vertically cut groove with a stereophonic pickup;

FIG. 2–BB indicates diagrammatically the vertical motion of the stylus when making or playing back a vertically cut groove in accordance with the diagram of FIG. 2–B;

FIG. 2–C is a vector diagram of the cutting forces applied to the faces of the record groove when a stereophonic cutter transducer forms an angularly cut groove of a stereophonically recorded sound, and also of the stereophonic output signals when playing back such angularly cut groove with a stereophonic pickup;

FIG. 2–CC indicates diagrammatically the angular motion of the stylus when making or playing back an angularly cut groove of a stereophonically recorded sound;

FIG. 3 is an explanatory diagrammatic front end view, from the stylus end, of a stereophonic pickup having stylus drive and guide connections exemplifying the invention;

FIG. 4 is a simplified diagrammatic front view, as seen from the stylus end, of a stereophonic pickup having stylus drive and guide connections based on the principles of the invention explained in connection with FIG. 3;

FIGS. 5, 6, 7, 8, 9 and 10 are front views, similar to FIG. 4, of stereophonic pickups having different forms of stylus drive and guide connections exemplifying the invention;

Figure 13:
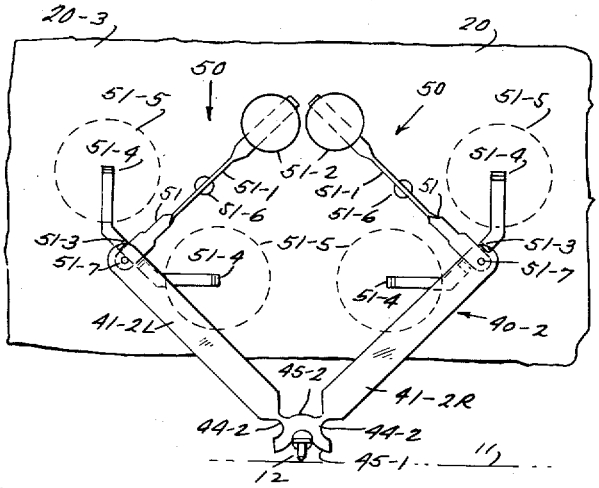
FIGS. 13 and 14 are front views similar to FIGS. 4–9, of still other types of stereophonic pickups having stylus drive and guide connections of the invention.
Figure 17:
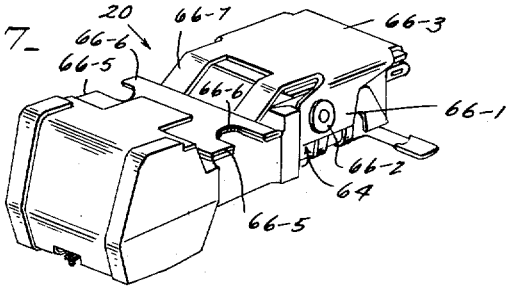
Figure 15:
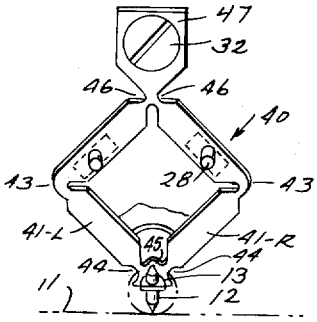
Figure 16:
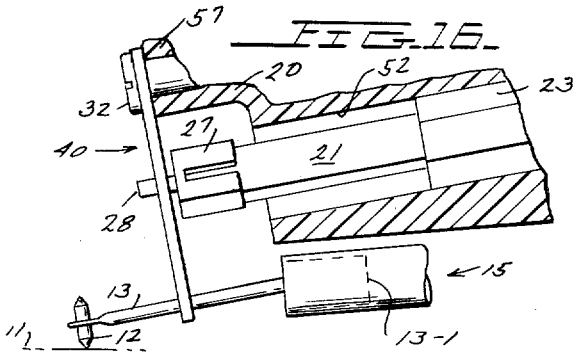
Figure 18:
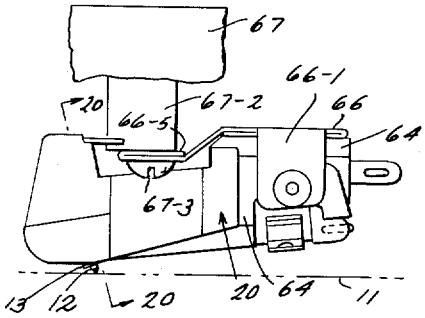
Figure 19A:
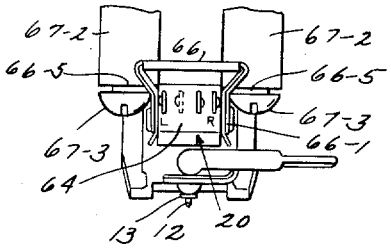
Figure 19:
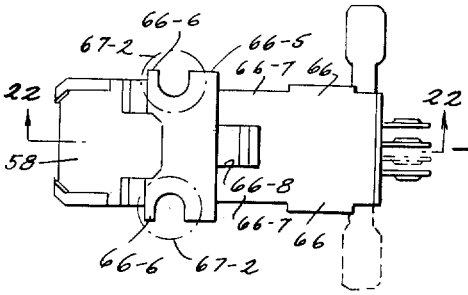
Figure 25:
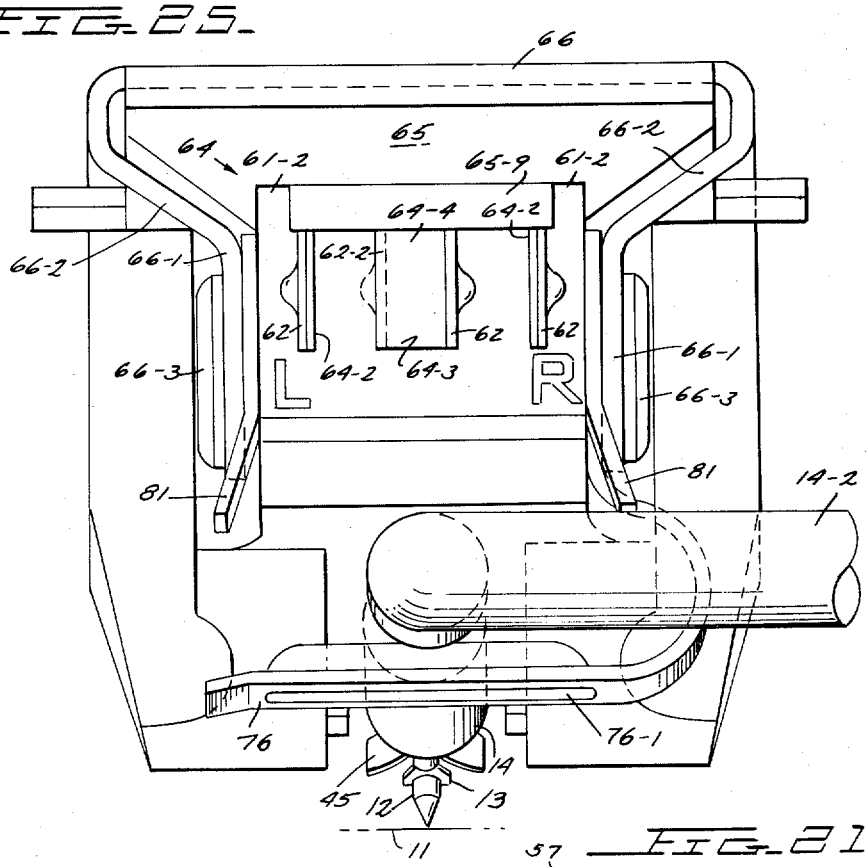
Figure 20:
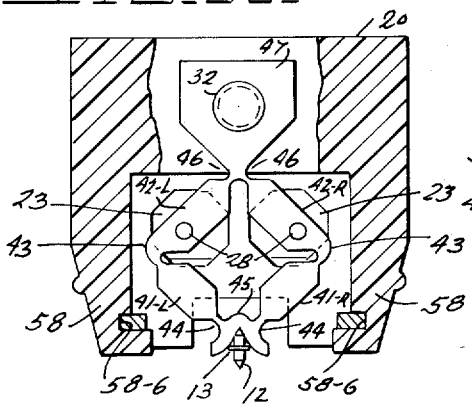
Figure 21:
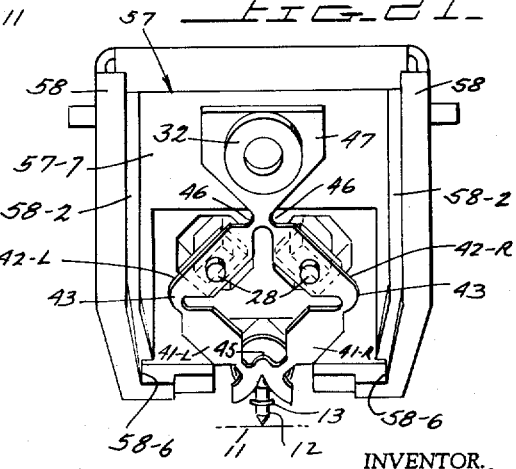
Figure 20A:
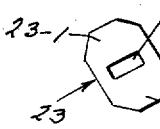
Figure 23:
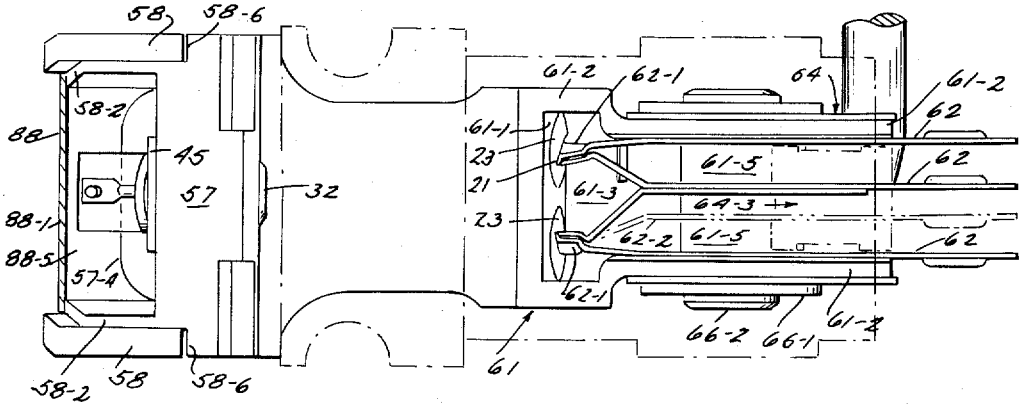
Figure 22:
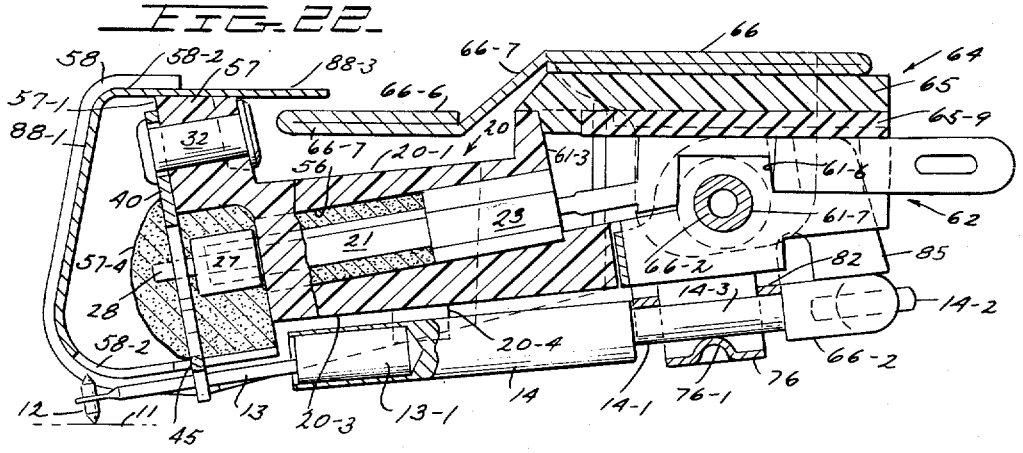
Figure 24:
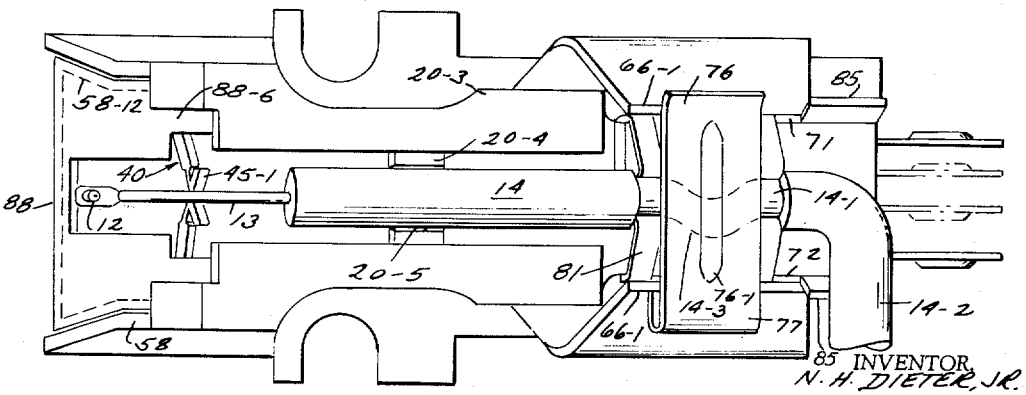
Figure 26:
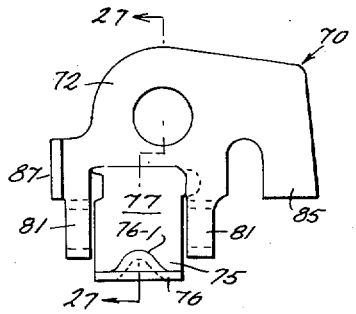
Figure 27:
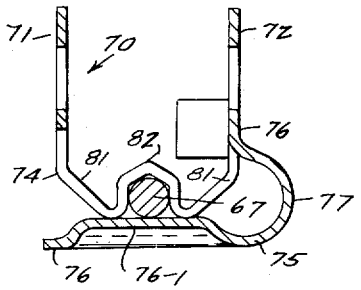
Figure 29:
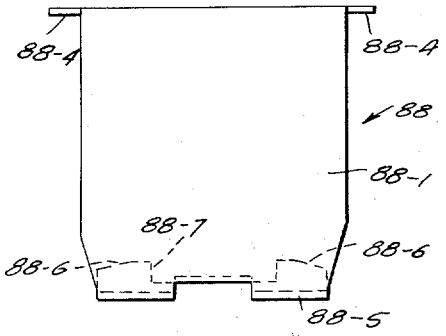
Figure 28:
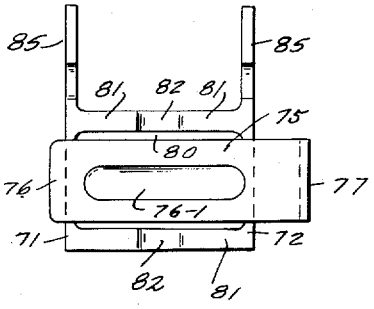
Figure 30:
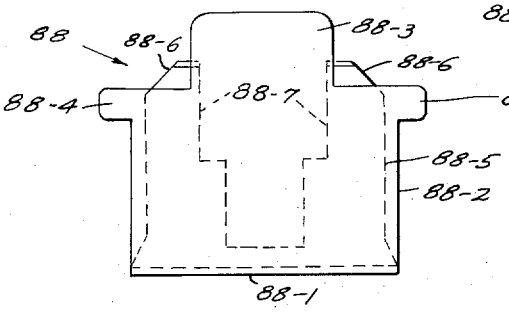
Figure 31:
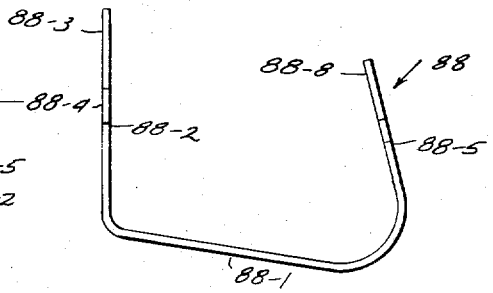

FIG. 13–A is a front view similar to FIG. 13, of a further type of stereophonic pickup having stylus drive and guide connections of the invention;

FIG. 15 is an exposed stylus front end view of the principal elements of a stereophonic pickup of the invention as manufactured, with parts broken away to show its interior;

FIG. 16 is a side view of some of the principal elements of the pickup shown in FIG. 15;

FIG. 17 is a perspective view of a stereophonic pickup of the invention, in the form in which it is being manufactured, other views of which are shown in the subsequent figures;

FIG. 18 is a side elevational view of a complete pickup of FIGS. 15–17, held on the tone arm of a disc phonograph;

FIG. 19 is a top view of the pickup of FIGS. 17 and 18;

FIG. 19–A is a rear end view of the pickup of FIGS. 17 and 18 as held on the tone arm;

FIG. 20 is a considerably enlarged cross-sectional view of the same pickup along line 20—20 of FIG. 18;

FIG. 20–A is an enlarged detail view of the elastomer bias body used with each of the piezoelectric transducers of the pickup of FIGS. 15–20, before the elastomer bias body is compressed when operatively mounted in the rigid pickup housing;

FIG. 21 is a front view of the pickup of FIGS. 17–20, with the front cover removed to show the interior parts thereof;

FIG. 22 is an enlarged vertical cross-sectional view of the same pickup along line 22—22 of FIG. 19;

FIG. 23 is a similarly enlarged top view of the same pickup with the front and rear covers removed to expose interior parts;

FIG. 24 is a similarly enlarged bottom view of the same pickup;

FIG. 25 is a similarly enlarged rear end view of the same pickup;

FIG. 26 is an enlarged side view of the stylus rod guide structure of the pickup of FIGS. 17–26;

FIG. 27 is a cross-sectional view of the stylus rod guide structure of FIG. 26 along line 27—27 of FIG. 26;

FIG. 28 is a bottom view of the stylus rod guide structure of FIGS. 26 and 27;

FIG. 29 is a front elevational view of the front compartment cover of the pickup of FIGS. 17–25; and FIGS. 30 and 31 are top and side views, respectively, of the cover of FIG. 29.

FIG. 1 shows diagrammatically and greatly enlarged, a microgroove portion 10 of a record disc rotating clockwise around the center axis either for making or playing back stereophonic signal sequences with the angularly disposed faces of the groove. Pursuant to the adopted standards for the 45–45 stereophonic record system, the inner wall or face of the record groove is designated as the left face or channel 10–L of the recorded stereophonic signals, and the outer wall or face of the groove is designated as the right face or channel 10–R of the recorded stereophonic signal. The two faces 10–L and 10–R of record groove 10 are 90° displaced from each other and each is 45° inclined to the horizontal or the disc surface. In accordance with the adopted standards, when two equal and in-phase signals are supplied to the two transducers of a cutter device, they should impart to the common stylus 12 (FIG. 2–AA) through their two link connections component motions perpendicular to the respective groove faces 10–L, 10–R, corresponding to vectors 11–L, 11–R, respectively, of vector diagram 2–A, and thereby impart to the stylus 12 a lateral cutting motion corresponding to the resultant vector 11–A of FIG. 2–A, as indicated in FIG. 2–AA.

Likewise, in accordance with adopted standards, when two equal but opposite-phase signals are supplied to the two cutter transducers, they should impart to the common stylus 12, component motions perpendicular to the respective groove faces 10–L, 10–R, corresponding to vectors 11–L and 11–R, respectively, of vector diagram 2–B, and thereby impart to the stylus 12 a vertical cutting motion corresponding to the resultant vector 11–A of FIG. 2–B, as indicated in FIG. 2–BB. When the two transducers of such cutter device are supplied at any instant with two signals of different amplitude, the two cutter transducers should impart through their two link connections to the common stylus 12, component motions in the direction perpendicular to the respective groove faces 10–L, 10–R corresponding to the vectors 11–L and 11–R, respectively, of vector diagram FIG. 2–C, and thereby impart to the stylus 12 an angular cutting motion corresponding to the resultant vector 11–A of FIG. 2–C, which is under an angle 11–T to the disc surface, as indicated in FIG. 2–CC.

When playing back a laterally cut groove, indicated in FIG. 2–AA, and corresponding to vector 11–A in FIG. 2–A, the lateral stylus motion should impart through its two 45° inclined links, two equal and in-phase motions to the two playback transducers, corresponding to vectors 11–L and 11–R in FIG. 2–A, respectively, resulting in generation of equal and in-phase signals corresponding to these vectors 11–L and 11–R of FIG. 2–A, which will cause two spaced loudspeakers to play back the recorded signal without any stereophonic effect. When playing back a vertically cut groove, the vertical stylus motion indicated in FIG. 2–BB and corresponding to vector 11–A in FIG. 2–B, should impart through its two 45° inclined links two equal but opposite-phase motions to the two transducers, corresponding to the vectors 11–L and 11–R, respectively, of FIG. 2–B, resulting in the generation of equal but opposite-phase signals corresponding to these vectors 11–L and 11–R of FIG. 2–B, which will cause the two speakers to generate corresponding sound sequences which tend to cancel each other. However, when playing back an angularly cut record groove, the angular motion of the stylus 12, as indicated in FIG. 2–CC and corresponding to vector 11–A of FIG. 2–C, should transmit through its two 45° links, respectively, two motions corresponding to vectors 11–L and 11–R in FIG. 2–C to its two transducers, resulting in the generation of two signals corresponding to vectors 11–L and 11–R, which cause the two speakers to generate sounds corresponding to these vectors 11–L and 11–R of FIG. 2–C, and thereby reproduce the stereophonically recorded signals.

As shown by the foregoing analysis, the stylus of an ideal stereophonic pickup should produce it its two transducers, voltages which correspond and are proportional to the left and right 45° components of the stylus motion. In other words, the pickup must have resolving means which resolve any motion of the stylus between the side walls 10–L and 10–R of a stereophonic record groove 10 into two component motions proportional to the electric signals that are to be delivered to the two transducers. Thus, an angular motion of the stylus indicated by vector 11–A in FIG. 2–C must be resolved by the resolving mechanism into two component motions corresponding to vectors 11–L and 11–R of FIG. 2–C, and cause these motions to generate in the two transducers, signals corresponding to these vectors 11–L and 11–R of FIG. 2–C.

In accordance with the invention, in a two-transducer stereophonic pickup for 45–45 record grooves, the stylus motion-resolving means combines two drive links that are inclined 45° to the record surface and have a driven end pivotally connected to the common stylus and a relatively remote guided portion or guided end connected to the respective transducer—with two pivotally joined guide links into a simple quadrangle link chain which accurately guides the motion of the two drive links and resolves the motion of the stylus into two mutually perpendicular component drive-link motions at angles of 45° to the record surface, corresponding to the two vectors 11–L, 11–R of vector diagram FIG. 2–C, as explained above. In such stylus motion-resolving means of a stereophonic pickup of the invention, each of the two guide links has an anchor end pivotally anchored on the fixed pickup mounting structure and a guide end pivotally connected to the driven or guided end of the respective drive link for preventing or suppressing motion of the drive link in a direction transverse to its length or at an angle other than 45° to the record surface 11 and permitting motion of the drive link only in the direction of its length at 45° to the record surface 11 when actuated by the stylus motion within the record groove irrespective of the angular direction of the stylus motion.

FIG. 3 indicates diagrammatically the principles underlying the stylus motion-resolving means of a stereophonic pickup of the invention, these principles also being applicable to a groove-cutting mechanism for cutting such sterephonic 45–45 records. FIG. 3 shows a pickup mounting structure or pickup 20 having two alike mechano-electric transducers 21 such as shown in FIGS. 15 and 16, each transducer serving to transduce motion thereof into a corresponding electric signal or vice versa. The transducers 21 shown may be of the piezoelectric ceramic type, for instance, in the form of a bilaminate such as disclosed in Crownover et al. Patent No. 2,769,-867. A restrained rearward part 23 (FIG. 16), of each transducer extends directly behind the plane of FIG. 3, which shows its movable front part which when flexed in a direction perpendicular to one of its larger faces 22, will generate corresponding electric signals or vice versa. The stylus 12 riding in a groove of a record disc 11 indicated by a dash-double-dot line (FIG. 3) is connected through two driving arms or links 24–L, 24–R, extending at 45° to the record surface, to the movable front end of the two transducers 21 for imparting thereto a bending motion perpendicular to its respective larger faces 22 when either of the two drive links 24 is moved in the direction of its length under a 45° angle to the record surface. Each drive link 24–L, 24–R, is pivotally connected at 26 to the common stylus. The opposite outer or guided end of each drive link 24–L, 24–R is connected to the movable front end of the respective transducer 21 having a coupling end portion 27 with a coupling pin 28 (FIG. 16) connected to the outer guided end of the respective drive links 24–L, 24–R. To the outer guided end of the two drive links 24–L, 24–R, are pivotally connected to two respective guide arms 31–L, 34–R extending at 45° to the record surface from a relatively fixed anchor element 32 and pivotally connected therethrough to the pickup mounting structure or pickup 20.

In FIG. 3, the pivot connection between the respective two sets of drive and guide links 24–L, 31–L and 24–R, 31–R, coincides with the coupling pin 28 of the respective transducer 21 which is driven by the respective drive link 24–L, 24–R extending from the common stylus 12. The four pivotally connected arm links 24–L, 24–R and 31–L, 31–R, are rigid and form a quadrangle chain 30, each arm of the quadrangle being 45° inclined to the record surface 11. The pivotally connected quadrangle 30 of two sets of drive and guide links 24–L, 31–L and 24–R, 31–R, has the stylus and anchor pivots 26, 32 at one set of opposite diagonal corners of the quadrangle chain lying in a plane transverse to the record surface 11, and the two transducers 21 are connected to the region at the other set of diagonal corners of the quadrangle lying in a plane generally parallel to the record surface. Each guide link 31–L, 31–R is pivotally anchored at one end so that they are constrained to move around their anchor pivot 32 and thereby guide the motion imparted to the respective guide links 24–L, 24–R by the common stylus 12.

The stylus has only a minute motion, and its maximum amplitude in either direction from a neutral or mid-position is at most about .002" for microgrooves of standard stereophonic 45–45 record discs. Considering the length of the drive arms or links 24–L, 24–R extending 45° to the record surface, such minute stylus motion imparted to one of the links, say link 24–R, in the direction of its length at 45° to the record surface, will cause only the other guided end of this link to perform such motion and thereby actuate the transducer 21 connected thereto. For example, when the record groove 10 imparts to stylus 12 a stylus force 11–L (FIG. 3), drive arm 24–R will be moved in the direction of its length at 45° to the record surface and cause the remote guide thereof to flex the transducer 21 connected thereto to dash-line transducer position 21–R for generating a corresponding signal. Because of the minute motion of the stylus, the transducer 21 connected to the other drive arm 24–R, will not be moved because this other drive arm 24–L will turn around its pivot connection 28 without imparting to its transducer 21 any motion and without generating any signals. A similar stylus motion imparted to the other drive link 24–L in the direction of its length at 45° to the record surface, will similarly drive only the transducer 21 connected thereto for generating thereby a signal without imparting any motion to the other transducer 21 connected to the other drive link 24–R. Accordingly, the quadrangle chain 30 of four pivotally connected drive and guide links of the type shown, having the movable stylus 12 and a fixed anchor point at diagonally opposite corners of the quadrangle chain, will resolve an angular motion of the stylus at an angle other than 45° to the record surface 11 into two component motions imparted to the drive arms 24–L, 24–R, corresponding, respectively, to the vectors 11–L, 11–R of the vector diagram of FIG. 2–C, as desired for ideal conditions. With such quadrangle chain of four pivotally connected transducer drive and guide links having the movable stylus and anchor point at diagonally opposite corners of the quadrangle chain, any stylus motion, such as a stylus motion under an angle T to the record surface other than 45°, will be resolved into two proper mutually perpendicular motion and force components transmitted to the two drive links 24–L, 24–R of the respective transducers 21, thus securing the ideal resolution of a motion of the stylus into the desired transducer operations, as explained in connection with FIG. 2–C.

FIG. 4 illustrates diagrammatically and in a general manner the construction of a stereophonic pickup based on the principles of the invention explained in connection with FIG. 3. The stylus 12 riding in a groove of a disc record indicated by dash-double-dot line 11, is connected to the movable parts of two transducers 21 by a quadrangle link chain generally designated 30. The quadrangle link chain 30 has two drive links 24–L, 24–R, and two guide links 31–L, 31–R, pivotally connected to each other at the corners of the quadrangle by a set of two diagonally opposite guide pivots and a set of two diagonally transverse opposite pivots consisting of a stylus pivot 26 and an anchor pivot 32. The anchor pivot 32 holds one corner of the quadrangle chain anchor in its operative position on the pickup mounting structure 20, as in FIG. 3. The movable front end of each of the transducers 21 is connected through coupling pin 28 to portions of the respective drive links 24–L, 24–R, which are relatively remote from the stylus and spaced from or near its guide pivot connections 29 to its respective guide links 31–L, 31–R. The fixed anchor pivot support 32 of the guide links 31–L, 31–R and their pivotal connection by guide pivots 29 to the guide ends of the transducer drive links 24–L, 24–R, assures that a minute stylus motion imparted to one of the drive links 24–L, 24–R, will be transmitted by the respective drive links to the respective transducer only by a motion in the direction of the length of the respective rigid drive links 24–L, 24–R. Since the guided portion of each respective drive link 24–L, 24–R is connected through its guide pivot 29 to its respective guide link 31–L, 31–R, each drive link 24–L, 24–R is permitted by its associated guide link to move only in the direction of the length of the rigid drive link and prevented from moving in a direction transverse to the length of the drive link when subjected to the minute stylus motion within a 45–45 microgroove of a stereophonic record disc.

In operation, for example, when stylus 12 is subjected to a minute stylus motion represented by vector 11–R in the direction of the length of rigid guide link 24–I and under 45° to the record surface, such motion of this guide link will flex the transducer 21 in a direction transverse to the major transducer surface 22 for thereby generating a corresponding output signal. Since the stylus motion is minute, the other transducer connected to the other drive arm 24–R by the other transducer coupling pin 28 will not be moved because the guided end of this other drive arm 24–R will perform only a minute turning motion around its pivot 29 and will not in any way flex its transducer 21 in a direction transverse to its major transducer surface 22 and will not generate therein any output signal. A similar minute stylus motion in the direction of the length of the rigid drive link 24–R of FIG. 4 will similarly drive only the transducer 21 which is connected thereto for generating a signal therewith, without imparting any motion to the other transducer 21 which is connected to the other drive link 24–L. The stylus motion-resolving or motion-segregating link quadrangle 30 of FIG. 4 will, however, resolve an angular motion of stylus 12 under an angle other than 45° to the record surface, for instance, a stylus motion corresponding to vector 11–A in FIG. 2–C under an angle T to the record surface 11, into two component motions corresponding to vectors 11–L, 11–R of FIG. 2–C, as desired for ideal conditions, in the same manner as explained in connection with FIG. 3. Since for minute stylus motions, the guide links 31–L, 31–R confine or limit the motion of the two stylus driven links 24–L, 24–R to the direction of their length under 45° to the record surface, a minute stylus motion, for example represented by vector 11–A in FIG. 2–C, under angle T to the record surface, will impart to the two drive links 24–L, 24–R motions corresponding to motion vector components 11–L, 11–R in FIG. 2–C, thereby causing their respective transducers 21 to generate complementary sterophonic signals corresponding to these vector components and proper playback of the stereophonic signals on the opposite groove faces 10–L, 10–R of the record groove 10, in the same manner as in the pickup of FIG. 3.

Stereophonic pickups with the motion-resolving quadrangle link chain of the invention of the type described above in connection with FIGS. 3 and 4, have to be suitably mounted in a relatively small space of a phonograph tone arm, and the over-all size of the pickup and its quadrangle link chain is small. Thus, as a practical example, a stereophonic pickup of the invention designed for mounting in the tone arms of commercial phonographs, may have the over-all length, height and width of 1.300 x .510 x .510 inch; and the length of the individual links of its motion-resolving quadrangle based on the principles shown in FIGS. 3 and 4, is about .180″.

In the stereophonic pickups as described above, the movable transducer portions 21 are shown coupled or connected by their transducer coupling ends or pins 28 to a portion of the respective drive links 24–L, 24–R of the motion-resolving quadrangle chain 30. Since in pickups designed for microgroove records the stylus motion has only a minute amplitude, similar desirable motion-resolving is also obtained by connecting the respective transducer 21, as through the coupling pin, to a part of the respective guide links 31–L, 31–R of the quadrangle chain 30, between their respective guide pivots 29 and mid-portion of such guide link 31–L, 31–R, without thereby impairing the desirable motion-resolving action of the quadrangle link chain 30, explained above. As an example, in the pickup of FIG. 4, instead of being connected to the transducer drive links 24–L, 24–R at the full-line positions of transducers 21 and transducer coupling pin 28 shown, the two transducers 21 may be coupled to the respective guide links 31–L, 31–R, in positions indicated by the dash-line coupling pin 28–A and dash-line transducer 21–A, without in any way impairing the motion-resolving action of the quadrangle link chain 30 in relation to the two transducers 21 of the stereophonic pickup of the invention.

The motion-resolving quadrangle link chain 30 of a pickup such as described in connection with FIG. 4 may operate with more than the four links 24–L, 24–R, 31–L, 31–R, shown. For instance, in the motion-resolving quadrangle link chain 30, each of the two guide links 31–L, 31–R may consist of two superposed overlapping and similarly extending links which are connected in the same manner between the two guide pivots 29 and anchor pivot 32 of a similar quadrangle link chain 30.

In the stereophonic pickup of the invention as described above in connection with FIGS. 3 and 4, the motion-resolving quadrangle chain 30 is maintained in its operative position shown by the anchoring connection of the quadrangle through the connection of anchor pivot 32 to the fixed pickup mounting structure 20 at the upper corner of the quadrangle chain 30 and by the connections of the two movable parts of the transducers 21 through their coupling pins 28 to the respective drive links 24–L, 24–R or their respective guide links 31–L, 31–R, as described above. In this operative position, the four chain links 24–L, 24–R, 31–L, 31–R are maintained in their mutually perpendicular operative relation and under 45° to the record surface. The mounting of the two transducers 21 on the pickup mounting structure usually permits only limited movement of the movable transducer part and its coupling pin 28, this transducer movement providing the proper compliance in relation to the stylus motion and the forces transmitted thereto. The operative positioning of the motion-resolving quadrangle chain 40 depends on the operative position of the movable transducer parts of the stereophonic pickup shown, in the same manner as the operative positioning of the stylus of a conventional pickup depends on the operable position of the movable transducer part thereof. Conventional pickups are usually provided with stylus stops which limit the maximum displacement that may be imparted by the stylus to the movable transducer part when the stylus is subjected to improper handling, as by pushing the pickup with the tone arm transversely across a record disc, or by improper manual or accidental force applied to the stylus. As will be described hereinafter, the movement of the stylus of the stereophonic pickup of the invention is likewise limited for preventing transmission of excessive forces from the stylus to the two transducers which are connected thereto.

In accordance with the invention, two transducers such as the two transducers 21 of the pickup shown, are additionally protected against the application of excessive forces or excessive motion to their movable transducer parts, such as to the transducer coupling pin 28, by providing the pickup mounting structure with stops which limit lateral movement of the guide links of the motion-resolving quadrangle chain 30 to the minute maximum range of movement which they have to perform in guiding the two transducer-driving drive links in response to the minute stylus motion imparted thereto. As shown in FIG. 4, such guide link stops may be provided by two stop lug or stop pin projections 31–A projecting from the mounting wall of the pickup mounting structure 20 on which anchor pivot 32 is mounted. The guide link stop projections 31–A may be positioned so that outward movement of the respective guide link 31–L, 31–R in the direction toward the respective stop pin 31–A is at most 2 to 10 times the maximum amplitude when moving in response to a minute stylus motion imparted to the respective drive link 24–L, 24–R, which is at most only about .002″ from a neutral position.

FIG. 5 shows diagrammatically one example as to how a pickup of FIG. 4 may be modified to additionally restrain displacement of the four quadrangle links 24–L, 24–R, 31–L, 31–R, of the quadrangle chain 30–1 from their mutually perpendicular positions and their 45° inclination to the record surface 11. In the pickup of FIG. 5, the stylus 12 is connected through two drive links 24–L, 24–R extending under 45° to the record surface to the transducers 21, in the same operating relation as in FIG. 4. The two drive links 24–L, 24–R of FIG. 5 form part of a motion-resolving quadrangle chain 30–1 which has two longer guide links 33–L, 33–R which are connected through pivots 29 to the guided ends of the two drive links 24–L, 24–R, respectively, as in FIG. 4. The guide links 33–L, 33–R of FIG. 5, which are mutually perpendicular and 45° inclined to the record surface, cross each other at a crossing point or position lying in a plane which passes through the stylus perpendicular to the record surface 11, and corresponding to the anchor pivot 32 of the motion-resolving quadrangle 30 of FIG. 4. Instead of having a common anchor connection to the pickup structure 20, the two longer guide links 33–L, 33–R of FIG. 5 have two anchor connections 34 to the relatively fixed pickup mounting structure 20 at two spaced portions thereof. The two anchor connections 34 of the two guide links 33–L, 33–R serve also as pivots which permit pivotal motion of the respective guide links around them, for guiding the motion of the respective drive links 24–L, 24–R in their stylus motion-resolving operation. The two longer guide links 33–L, 33–R guide the two drive links 24–L, 24–R of the motion-resolving quadrangle link chain 30–1 of FIG. 5 in the same manner as the guide links 31–L, 31–R guide of the drive links 24–L, 24–R of the motion-resolving quadrangle chain of the pickup of FIG. 4. The description of the operation of the stylus motion-resolving quadrangle chain 30 of FIG. 4 given above, fully applies to the motion-resolving quadrangle chain 40–1 of FIG. 5, and they operate in the same manner in causing any angular stylus motion, for instance, under angle T to the record surface as shown in vector diagram FIG. 2–C, to be resolved into motion components corresponding to the vectors 11–L, 11–R transmitted by the two drive links 24–L, 24–R to the two transducers 21 of the pickup of FIG. 5.

The provision of the two spaced anchors 34 of the motion-resolving quadrangle 30–1 of FIG. 5 suppresses turning motion of the quadrangle chain such as might occur if the four links of the quadrangle were connected to the mounting structure 20 solely by a common anchor pivot, such as anchor pivot 32 of the quadrangle chain 30 of FIG. 4. To limit maximum motion that might be imparted to the two transducers 21 coupled to the links of the quadrangle chain 30–1 of FIG. 5, the pickup mounting structure has two guide link stops 31–A which limit their outward projecting movement, in the same manner as the corresponding stops 31–A limit outward movement of the guide links of the quadrangle chain 30 of FIG. 4. For the purposes of this application it is assumed that each of the different modifications of the pickups of the invention described herein, is provided with similar stop projections 31–A which limit in a similar manner the movement of the guide links of the analogous motion-resolving quadrangle link chains 30 and thereby limit the movement of the transducers connected thereto.

The minute motion of the two longer guide links 33–L, 33–R of the quadrangle chain 30–1 of FIG. 5 at the cross-over region at which their faces move relatively to each other, does not introduce any frictional disturbances into their motion-resolving operation. In practice, the parts of the motion-resolving quadrangle 30–1 of FIG. 5, like that of FIG. 4, are positioned in a compartment of the pickup in which is placed a quantity of silicone fluid containing dispersed therein inert filler particles which cause the inert-particle-containing silicone fluid to remain within such compartment space throughout the operating life of the pickup, without tending to escape or escaping from the compartment through the opening thereof into the exterior or other spaces. Such silicone fluid is also effective as a lubricant which suppresses friction between any moving parts such as the cross-over parts of the quadrangle links 33–L, 33–R of FIG. 5. Electro-mechanical devices operating with such inert-particle-containing silicone fluid are the subject-matter of Smith-Johannsen Patent No. 2,879,413, assigned to the assignee of the present applicant. Otherwise, the motion-resolving quadrangle link chain of the pickup of FIG. 5 operates in the same manner as the quadrangle link chain 30 of the pickup of FIG. 4.

FIG. 6 shows another example as to how a pickup of FIG. 4 may be modified to additionally restrain displacement of the four quadrangle links 24–L, 24–R, 31–L, 31–R of the quadrangle chain 30–2 from their mutually perpendicular relation and their 45° inclination to the record surface 11. The pickup of FIG. 6 has a stylus 12 and two transducers 21 connected to the stylus by two drive links 24–L, 24–R, in the same manner as in the pickups of FIGS. 4 and 5. The two drive links 24–L, 24–R of FIG. 6 form part of a motion-resolving quadrangle chain 30–2 which has two longer guide links 35–L, 35–R which are connected through pivots 29 to the guided end of the two drive links 24–L, 24–R, respectively, as in FIGS. 4 and 5. The two guide links 35–L, 35–R of FIG. 6, which are mutually perpendicular and under 45° to the record surface, have two anchor connections 34–1 to the relatively fixed pickup mounting structure 20 at two spaced portions thereof, corresponding to the two spaced anchor connections 34 of the pickup of FIG. 5. The two anchor connections 34–1 of the two guide links 35–L, 35–R serve also as pivots which permit pivotal motion of the respective guide links around them for properly guiding the respective drive links 24–L, 24–R in their stylus motion-resolving operations, as described above in connection with FIGS. 4 and 5. As in the pickup of FIG. 4, the motion-resolving quadrangle chain 30–2 of FIG. 6 may have the two transducers 21 connected to portions of the respective guide links instead of to the drive links 24–L, 24–R of quadrangle chain 30–2. In FIG. 6, dash-line 28–B indicates the position at which the coupling pins 28 of the respective transducers may be coupled to portions of the guide links 35–L, 35–R extending beyond their pivot connections 29 to the respective guide links of the respective drive links 24–L, 24–R of the motion-resolving quadrangle chain 40–2.

Motion-resolving quadrangle link chains of the type described above in connection with FIGS. 3–6, may be made of any of the known metals suitable for making stiff, tiny, rigid links or arms having a length of the order of .150″ to .250″. Among suitable metals are strong, elastic aluminum alloys of the type used in stressed aircraft structures, titanium alloys, also Phosphor bronze, steel, and the like. Such motion-resolving quadrangle link chains of the invention may also be made of any synthetic resin or plastic material that is suitable for making stiff rigid links or arms having a length of the order of .150″ *to* .250″, such as nylon, rigid type linear polyethylene, polystyrene, cellulose-acetate butyrate (which is available commercially as "Tennite 2"). The pivot connections between the links may be made out of the same materials as the rigid links.

In accordance with the invention, the rigid links and the pivotal link connections of the motion-resolving quadrangle link chains of the type described above, form part of a single, integral structure, thereby simplifying the assembly and the mounting of the tiny stylus motion-resolving quadrangle link chain in operative position on stereophonic pickup or cutter.

FIG. 7 shows by way of example a stereophonic pickup of the invention having one form of a motion-resolving quadrangle link chain, all elements of which are formed of a single, integral metal member. The pickup of FIG. 7, which is otherwise similar to that described above in connection with FIG. 4, has a stylus motion-resolving quadrangle link chain 30–2 formed of a thin, integral tubular metal member having two rigid stylus drive links 37–L, 37–R, two rigid guide links 38–L, 38–R, which are pivotally connected at the corners of the quadrangle, and having at one set of diagonally opposite quadrangle corners the stylus 12 and the fixed anchor pivot connection 32, operating in the same manner as the corresponding elements of quadrangle link chain 30 of FIG. 4.

The quadrangle link chain 30–2 of FIG. 7 may be formed, for instance, of thin metal tubing of metal such as strong, elastic aluminum alloy or titanium alloy, having an outer diameter of about .020", which will form relatively rigid, short links 37–L, 37–R, 38–L, 38–R of a stylus motion-resolving quadrangle link chain of the type described above. In the quadrangle link chain 30–2 of FIG. 7, flattened portions of the tubing provide the flexible pivot junctions between the rigid link arms of the quadrangle chain 30–2. As shown in FIG. 7, the flexible pivot junctions 36–3 between the drive links 37–L, 37–R and their respective guide links 38–L, 38–R, are formed by flattening portions of the tubing so that the flattened surface of these pivot junctions 36–3 extends in a direction perpendicular to the general plane of the four links 37–L, 37–R, 38–L, 38–R. Another stylus portion 36 of the tubing of the quadrangle link chain 30–2, to which the stylus 12 is joined, is likewise flattened to provide a rigid intermediate portion 36 to which the stylus 12 is connected, and two flexible flattened tubing portions 36–2 flattened in the same direction as the lateral pivot junctions 36–3 provide similar flexible connections between the rigid stylus-carrying portion 36 and its two rigid stylus drive links 37–L, 37–R. The rigid stylus-carrying element 36 may be given the required rigidity by securing thereto, as by affixing as by cement, welding or solder, a rigid backing element 36–1 of metal or resin material to which the stylus is connected, and thereby provide a rigid stylus section 36 of the quadrangle link chain 30–2 to which the stylus is connected. In the form shown, the backing element 36–1 of the rigid stylus portion 36 has a coupling recess 36–4 for detachably coupling thereto an exchangeable stylus-carrying element, as described below.

In accordance with the invention, the stylus portion of a quadrangle link chain of a stereophonic pickup (or cutter) of the invention is shaped and arranged so as to serve as a stylus-coupling element to which a detachable stylus element may be detachably coupled for ready exchange and replacement in operative position relatively to the quadrangle link chain and other portions of the stereophonic pickup, in the same manner as the detachable stylus-carrying element is arranged for detachable mounting on the pickup mounting structure of a conventional type pickup, such as described and claimed in U.S. Klingener Patent 2,717,929 of 1955. Thus the stylus 12 may be affixed to and carried on the forward end of a thin metallic drive rod 13 such as shown in FIG. 16, the rear part of which is seated and embedded in a rubber-like elongated body portion 13–1 of elastomer material by means of which it is held in a relatively rigid tubular seating member 14 with which the stylus forms a self-supporting stylus unit 15 which is detachably seated or held in operative position on the pickup mounting structure 20, as in the pickup of the referred-to Klingener patent.

The detachable stylus unit 15 of the type shown may carry only a single stylus, and its relatively rigid seating member 14 may be arranged for coupling it detachably with a single-stylus unit in operative position on the pickup mounting structure. Alternatively, as disclosed in the Klingener patent, the forward end of the thin stylus rod 14 of the stylus unit 15, may carry two differently directed styli for operation with record grooves of different dimensions, such as microgrooves and larger-size grooves, and it may have a rotary seating portion 14 arranged to be rotatively held on the pickup mounting structure to permit turning of the stylus unit 15 around its axis for bringing either one of the styli 12 into record-groove engaging operative stylus position, as disclosed in the referred-to Klingener patent. The stylus portion of the quadrangle link chain 30–2, is made rigid by affixing to the central part of the flexible flattened tubing parts 36–2 a rigid reinforcing stylus element 36 which has a downwardly opening coupling recess 36–1 shaped to receive and hold therein the forward portion of the stylus-carrying thin stylus rod of the detachable stylus unit 15 to permit ready replacement thereof and to assure that the stylus portion 36 of the quadrangle link chain 30–2 (FIG. 7) is at all times operatively coupled to the stylus 12 in accordance with the minute undulations of a record groove. However, the stylus unit 15 may be removed as a unit and replaced or exchanged in its operative position on the stereophonic pickup in the manner explained in the referred-to Klingener patent.

The guide links 38–L, 38–R of the quadrangle link chain 40–2 have flattened end portions 36–4 provided with overlapping pivot holes by means of which they are pivotally seated on a pivot portion of the anchoring pivot 32 which holds them pivotally affixed to or anchored on the pickup mounting structure 20. The flattened overlapped portions 36–4 of the two guide links 38–L, 38–R, have an over-all thickness not greater than the rigid tubing portions which form the rigid links 37–L, 37–R, 38–L, 38–R, of the quadrangle link chain 30–2. The two transducers 21 are coupled with their coupling pins 28 to portions of the rigid drive links 37–L, 37–R of the quadrangle chain 30–2 of FIG. 7. The two drive links 37–L, 37–R which have the coupling openings for the transducer coupling pins 28 may likewise be flattened to provide openings for the transducer coupling pins 28. As described in connection with FIGS. 4 and 6, the transducer coupling pins may be inserted in suitable coupling openings of the guide links 37–L, 37–R for transmitting to the two transducers 21 the resolved motion components of the stylus motion as isolated by the motion-resolving operation of the quadrangle link chain 30–2 in accordance with the vector diagram of FIG. 2–C.

FIG. 8 shows by way of example, a stereophonic pickup having another form of motion-resolving quadrangle chain 30–3, all elements of which are formed of a single integral metal member. The pickup of FIG. 8, which is otherwise similar to that described above in connection with FIGS. 4 and 7, has a stylus motion-resolving quadrangle link chain 30–3 formed of an integral, thin, flat sheet-metal member having four rigid links 37–1L, 37–1R, 38–1L, 38–1R which are pivotally connected at the quadrangle corners. Quadrangle chain 30–3 has at one set of diagonally opposite quadrangle corners a rigid stylus portion 39–1 with a stylus 12 and fixed anchor pivot connection 32, operating in the same manner as the corresponding elements of quadrangle link chain 30 of FIG. 4. The rigid link arms 37–1L, 37–1R, 38–1L, 38–1R lie with their flat surfaces in a plane facing the front surface of the pickup, and they are joined to each other and to the rigid stylus portion 39–1 by flexible pivot junctions 39–2 and 39–3. The flexible junction pivot portions 39–2 and 39–3 may be formed by flattening correspondingly spaced portions of a straight, elongated tubing and then folding the rigid link arms at the flexible pivot portions 39–2, 39–3 into the quadrangle shape. However, as shown in FIG. 8, the flexible pivot junctions 39–2, 39–3 of the quadrangle link chain 30–3 are formed by twisting portions of the length of the elongated metal strip—out of which the link chain 30–3 is formed—90° out of the plane in which the strip-shaped four rigid links lie. After so twisting the junction portions of the flexible links 39–2, 39–3 out of the plane of the rigid links, the strip with the four rigid links may be folded along the flexible links into the quadrangle shape shown in FIG. 8.

The stylus portion 39–1 of the quadrangle link chain 30–3 is made rigid by affixing thereto a stylus coupling element 39–4 to which the stylus 12 is connected. The stylus coupling element may be formed of a rigid body portion of synthetic resin or plastic material, or of metal, which is joined as by cement to the central portion of a 90° twisted flexible portion of the strip out of which the flexible stylus junctions 39–2 are formed. For instance, if made of plastic material, the stylus coupling element 39–4 may have a slit in which the metal strip of the flexible link portions 39–2 is placed and affixed as by cement, which fills all the narrow spaces of the slit, thereby joining the flexible strip of stylus portion 39–1 of the chain link 30–3 with the rigid stylus coupling element 39–4 of the quadrangle link chain 30–3. The rigid stylus element 36 of the quadrange link chain 30–2 of FIG. 7 may be similarly made. The stylus coupling portion 39–4 may be formed with a recess 39–5 similar to the recess 36–4 of FIG. 7, for holding coupled therein the thin drive rod of a stylus unit 15 such as described in connection with FIGS. 15 and 16, in the same manner as described in connection with the corresponding coupling part 36 of the quadrange link chain 30–2 of FIG. 7.

Alternatively, the rigid stylus portion of quadrangle link chain 30–3 of FIG. 8, like that of FIG. 7, may be formed by folding a length of the strip portion which forms the flexible pivot portions 39–2 into a folded, rigid stylus section of the quadrange 30–3 to which the stylus 12 is secured or coupled.

Figure 9:
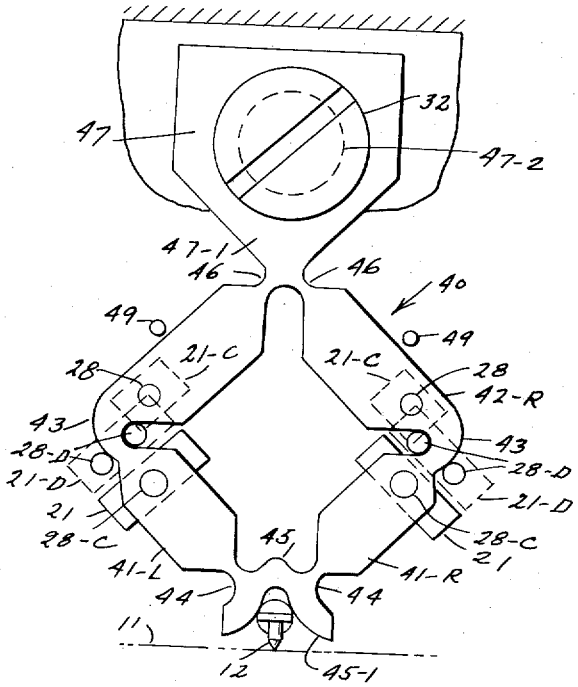

In accordance with the invention, the rigid as well as the pivotal junction elements at the corners of a motion-resolving quadrangle link chain of a stereophonic pickup (or cutter) of the invention, are formed of a single thickness of sheet material either of metal or synthetic resin or plastic substance of the type described above. FIGS. 9, 15 and 16 show a stereophonic pickup of the invention wherein all portions of the motion-resolving quadrangle link chain are formed of a single thickness of sheet material having the required strength and elastic properties for the rigid elements and the flexible pivot elements thereof. The pickup of FIGS. 9, 15 and 16, which is otherwise similar to that described above in connection with FIGS. 4, 7 and 8, has a motion-resolving quadrangle link chain 30 of the invention with four rigid links 41–L, 41–R, 42–L, 42–R, a rigid stylus portion 45 and rigid anchor portion 47, which are interconnected to each other by flexible pivot junctions 44, 43 and 46, for performing the stylus motion-resolving operations as described in connection with FIG. 4. All elements of the quadrangle link chain 30 are formed as by punching or cutting from a thickness of sheet material having the required physical characteristics.

The stylus portion 15 of the quadrangle link chain 40 of FIGS. 9, 15 and 16, is relatively rigid. Although it may have affixed thereto the stylus 12, the stylus portion 45 is shown provided with a coupling recess 45–1 shaped for detachably coupling thereto a stylus-carrying rod 13 of a stylus unit 15 such as shown in FIG. 16. The rigid stylus element 45 of the quadrangle link chain 40 is joined by two flexible junction elements 44 of the sheet material to the wider rigid drive link 41–L, 41–R which extend therefrom under a 45° angle to the record surface. The two rigid guide links 42–L, 42–R are connected by flexible junction pivot elements 46 to a rigid neck portion 47–1 of the rigid anchor portion 47 of the quadrangle link chain 40. All these elements of the quadrangle link chain 45, 41–L, 41–R, 42–L, 42–R, and 47, as well as the flexible junction pivot elements 44, 43 and 46, form an integral structure and they are made from a thickness of sheet material, although some of the elements thereof may be reinforced by securing thereto as by cement or welding, overlapping backing sheet elements, for instance, to the rigid links 41–L, 41–R, 42–L, 42–R, the anchor element 47 and the stylus element 45 thereof.

The drive links 41–L, 41–R of the quadrangle link chain 40 have coupling openings in which the transducer coupling pins 28 of the respective transducers 21 are properly seated in coupling driving engagement therewith. As described in connection with the pickup of FIGS. 4 and 6, the movable transducers portions 21 may be coupled with their coupling ends or pins 28—instead of to the guide links 42–L, 42–R, as shown—to the drive links 41–L, 41–R of the quadrangle link chain 40 of the pickup of FIG. 9. Such movable transducers portions are shown in FIG. 9 by the dash-line coupling pins 28–C on the drive links 41–L, 41–R of quadrangle link chain 40, showing the position in which the transducer coupling pins of the respective transducers 21 may be coupled thereto instead of to the guide links 42–L, 42–R. Alternatively, each of the two transducers 21 may have at its movable drive end two coupling pins—such as coupling pins 28–D extending from transducer 21–D shown in dotted lines—in a position where the transducer coupling pins 28–D embrace the narrow flexible junction portion 43 between the rigid drive links 41–L, 41–R and the respective rigid guide links 42–L, 42–R and the two opposite lateral corners of the quadrangle link chain 40. The engagement of a pair of transducer coupling pins 28–C with the opposite boundary surfaces of the flexible pivot junctions 43 between the two drive links 41–L, 41–R, and the respective guide links 42–L, 42–R, will provide good driving coupling connections between the movable transducer portions 21–B and the respective drive links 41–L, 41–R, having the same effectiveness as obtained by coupling the movable transducer ends 21 to either the drive links 41–L, 41–R, or the guide links 42–L, 42–R, by a coupling pin such as coupling pin 28 or 28–C extending from the movable transducer end portion and seated in coupling drive engagement within seat openings of the respective drive links 41–L, 41–R or respective guide links 42–L, 42–R.

The anchor portion 47 of quadrangle link chain 40 of FIG. 9, is held affixed to the rigid pickup mounting structure 20 in which the two transducers 21 are operatively mounted by means of a rivet or screw 32 passing through a hole 47–2 in the anchor portion 47, the head of the rivet or screw overlying and clamping to the underlying wall of the pickup mounting structure 20 the flat quadrange anchor portion 47 so that it remains affixed thereto. However, the two guide links 42–L, 42–R of the motion-resolving quadrangle link chain 40 may flex relatively to the rigid, fixed anchor portion 47 thereof by its two flexible pivot junctions 46 made of the thickness of the sheet thereof.

The stylus motion-resolving quadrangle link chain 40 is also combined with stops which limit lateral turning or movement of the two guide links 42–L, 42–R in the direction of their major surface or plane to the maximum range of movement required for performing their desired motion-resolving operations as described above in connection with FIG. 4 and the guide link stops 31–A thereof. Each stop 31–A is suitably affixed to the pickup mounting structure 20. It should be understood that, even if not shown, each of the motion-resolving quadrangle chains described in connection with the various figures of the present application, combines the guide link of the quadrangle link chain of such pickups with similar stops for similarly limiting the maximum amplitude of movement of the quadrangle guide links or drive links of the stereophonic pickups and cutters of the type disclosed herein.

A stereophonic pickup of the invention which has been placed on the market operates with a minute motion-resolving quadrangle link chain 40 such as described above in connection with FIG. 9, all elements of which are formed of a single thickness of a nylon sheet .020" thick, which provides a simple, compact and efficient stylus motion-resolving structure which is easily mounted and assembled to the other elements into a very effective stereophonic pickup.

When playing back a record, the pickup stylus is moved by the walls of the record groove for imparting to the pickup transducers a motion corresponding to the undulations of the record groove. The mass and the stiffness of the pickup transducers resist the motion forces transmitted by the stylus and they exert corresponding opposite reaction forces on the stylus and therethrough on the walls of the record groove. As is well known, it is desirable to reduce to a minimum these reaction forces exerted on the stylus by the mass and the stiffness of the pickup transducers, or in other words, to reduce to a minimum the mass and stiffness of the pickup transducers which are reflected on the pickup stylus at the point of engagement with the walls of the record groove.

As explained above in connection with FIG. 9, the movable transducer portions of the two transducers 21 may be coupled with their movable coupling ends or coupling pins 28 either to the two drive links 41–L, 41–R, or to an intermediate portion of the length of the guide links 42–L, 42–R of the motion-resolving quadrangle link chain 40, all of which links extend under 45° to the record surface 11. When the movable transducer ends or coupling pins 28 of the two transducers 21 are coupled to the two drive links 41–L, 41–R, respectively, which adjoin the stylus 12, each of the respective transducer end portions 28 is driven with the full amplitude of the motion component with which the respective drive link 41–L, 41–R is driven by the groove-undulated stylus 12. On the other hand, when the movable transducer ends or coupling pins 28 are coupled to an intermediate portion of the two guide links 42–L, 42–R, as indicated by the coupling pins 28–C of FIG. 9, each of the respective transducer end portions 28 is moved by the respective guide links 42–L, 42–R with a reduced motion smaller in amplitude than the full motion amplitude of the respective drive links 41–L, 41–R. The resultant reduction in the motion amplitude of the transducers 21 corresponds to the reduced lever length represented by the ratio of the reduced length of the guide links extending from their pivot connections 46 to the fixed pickup structure 20, to its intermediate transducer coupling portions 28–C to the full length of the respective guide links. By choosing the coupling point connection 28–C of the two movable transducers along an intermediate portion of the length of the respective guide links 42–L, 42–R of the stylus motion-resolving quadrangle 40, the magnitude of the reflected mass and stiffness of the transducer at the common stylus 12 may be reduced to any desired value below the full magnitudes thereof obtained when the movable transducer coupling ends 28 are connected or coupled directly to the drive links 41–L, 41–R, respectively, of the motion-resolving quadrangle 40, as shown by the full-line coupling connection 28 of FIG. 9. As described below in connection with FIGS. 15, 16, and 19–28, in the commercially used pickup of the invention the movable transducer coupling ends 28 are connected to intermediate portions of the two guide links 42–L, 42–R, respectively, of the motion-resolving quadrangle, thereby securing the desired reduction in the reflected masses and stiffness of the two transducers 21 at the point of engagement between their common stylus and the record groove engaged thereby.

Each of the record transducing devices of the invention described above will operate not only as a pickup for playing back two different record sequences represented by groove undulation sequences of different segmental portions of a single groove engaged by the common pickup stylus, but also as a recording device which produces such records on a record member in a manner analogous to the related devices of the referred-to Keller et al. patent. When operating as a recording device, the two transducer elements are supplied with distinct electric signal sequences, for instance, from two sterophonically placed microphones which cause the two transducers to drive the common stylus under control of the quadrangle link chain, or in general, multi-link chain, with corresponding motion sequences, and thereby actuate the common stylus to cut a record groove with one segmental region of the cut groove consisting of groove undulations corresponding to one supplied electric signal seqeunce, and the other segmental region of the cut groove consisting of groove undulations corresponding to the other supplied electric signal sequence.

In each of the record transducing devices of the invention described herein, the stylus and the transducer system are carried in their operative positions by a relatively rigid mounting structure so that the stylus may move or vibrate simultaneously in two different planes with at least one of the planes extending transversely to the axis of the stylus. When designed for use with the adopted 45–45 record system, the stylus and the transducer system are carried in their operative positions by the mounting structure so that the stylus may move simultaneously in two transverse planes extending at equal angles to the surface of the record member and also at equal angles to the axis of the stylus.

Proper control of the motion transmission between the transducers and the common stylus is secured by a motion-controlling multi-link chain of at least four pivotally joined links which may form either a quadrangle-shaped link chain or a link chain of other shape, which controls and guides the motion-transmitting action of the links extending between the transducer and the stylus so that when recording, the stylus will be driven by each of the transducers with distinctly controlled motion which causes the stylus to cut a record groove wherein one segmental region of the groove has cut therein an undulation sequence corresponding to the signals supplied to one transducer, and wherein the other segmental region of the same groove has cut therein an undulation sequence corresponding to the signals supplied to the other of the two transducers. In such transducer device, each drive link extending in a different direction from the stylus and providing its motion linkage to the respective transducers, forms with the adjoining guide link one of two link sets of the motion-controlling multi-link chain having at least four pivotally joined links, and controlling the motion-transmitting action of the links in transmitting the motion between the stylus and the respective transducer.

When the stylus of such record transducing device is engaged and driven by the different record sequence undulations extending along different segmental regions of a record groove engaged thereby, the motion-controlling multi-link chain thereof having at least four pivotally joined links, will control the motion-transmitting action of the links extending between the stylus and the two transducers so as to resolve the stylus motion into two motion components imparted to the two transducers corresponding to the distinct groove undulation sequences along the two different segmental regions of the groove, for causing the two transducers to supply distinct electric outputs corresponding to the different record undulation sequences of the play-back groove.

In such record-transducing devices of the invention the drive links as well as the guide links of the motion-controlling link chain may be formed of structural elements distinct from the structures of the two transducer elements with which they cooperate. On the other hand, essential portions of the two transducer elements which are connected by the transducer system to the common stylus may form parts of links of the motion-controlling multi-link chain containing at least two drive links and at least two guide links. As an example, as described above, two distinct transducer portions of the two distinctly operating transducer elements, may form guide links which are connected through the drive links to the transducer so as to form with the drive links a motion-controlling four-link chain operating in the manner described above.

Figure 10:
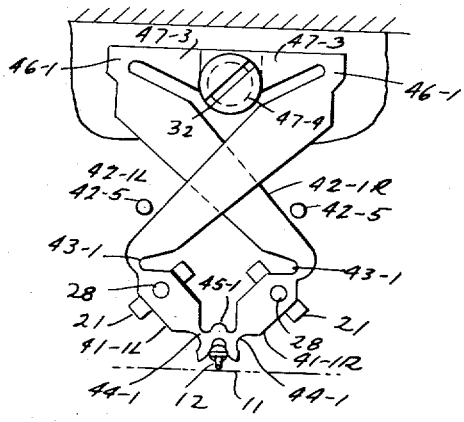
Figure 11:
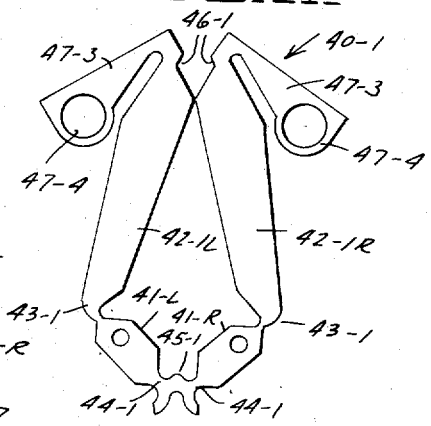
FIG. 11 is a plan view of the stylus drive and guide unit of the pickup of FIG. 10, before assembly of the pickup.

FIG. 10 shows how a motion-resolving quadrangle link chain of a stereophonic pickup of the type described in connection with FIG. 5, and having crossing guide arms, may have all its elements formed of a single thickness of sheet material. The pickup of FIG. 10, which is otherwise similar to those described in connection with FIGS. 4, 5 and 9, has a motion-resolving quadrangle link chain 40–1 made out of a sheet of suitable strong material, such as described above, and having two rigid drive links 41–1L, 41–1R and a rigid stylus portion 45–1 connected to the drive links through flexible pivot junctions 44–1 as in the corresponding parts of the quadrangle link chain 40 of FIG. 9. To the two rigid drive links 41–1L, 41–1R of the quadrangle link chain 40–1, are joined by pivotal flexible pivot junctions 43–1, two rigid guide links 42–1L, 41–1R, which cross each other and have ends connected through flexible pivot junctions 46–1 to fixed anchor portions 47–3, 47–3, corresponding to the fixed anchor portion 47 of the quadrangle link chain 40 of FIG. 9. All the above-described elements of the quadrangle link chain 40–1 of FIG. 10 are formed by cutting or punching out of a single sheet of material in the shape of a sheet blank in which the quadrangle link chain 40–1 is shown in FIG. 11, where all the elements of the chain 40–1 lie in the plane of the sheet out of which they are cut. After punching the blank 40–1 shown in FIG. 11, the two guide links 42–1L, 42–1R are turned on pivot junctions 43–1 from the position shown in FIG. 11 into the crossed-over operative position shown in FIG. 10 for clamping their anchor portions 47–3 with the overlapped, aligned anchor openings 47–4 to the underlying relatively rigid wall of the pickup mounting structure 20, in the same manner as the fixed anchor portion 47 of the quadrangle link chain 40 of FIG. 9 is affixed in its operative position to the rigid wall of the pickup mounting structure 20. To the rigid drive links 41–1L, 41–1R of the quadrangle link chain 40–1 of FIG. 10, are coupled the two transducers 21, as by transducer coupling pins 28 sealed in coupling driving engagement within seating holes or openings of the respective drive links 41–1L, 41–1R of the quadrangle link chain 40–1 or in similar coupling openings of its guide links 42–1L, 42–1R, in a manner similar to that described in connection with the pickup of FIG. 9. The mounting structure 20 may have guide link stops 42–5 for the quadrangle chain guide links 42–1L, 42–1R for limiting the amplitude of movement, as described above in connection with FIGS. 4, 5 and 9.

Figure 12:
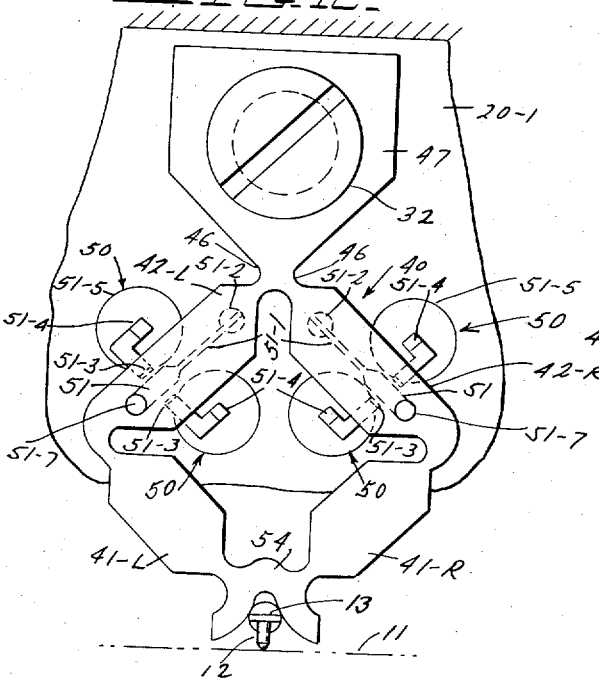
FIG. 12 is a front view similar to FIGS. 4 and 9, of another stereophonic pickup with different stylus drive and guide connections exemplifying the invention.

Stereophonic pickups (or cutters) operating with a motion-resolving quadrangle link chain of the invention are of value not only when operating with piezoelectric signal transducers, but also when operating with other types or signal transducers, such as, by way of example, electromagnetic transducers which are used in such applications. FIG. 12 shows diagramatically, by way of example, a stereophonic pickup having a stylus motion-resolving quadrangle link chain of the invention in combination with two electromagnetic signal transducers of the type used in conventional pickups of the type described, for instance, in Bachman Patent No. 2,511,663. In a relatively rigid pickup mounting structure 20–1 are suitably mounted the operative elements of two electromagnetic voltage-generating transducer units 50 of the type described, for instance, in the referred-to Bachman patent. Each transducer 50 has a magnetic armature 51 secured for oscillatory movement by a flexible portion 51–1 thereof to a fixed support 51–2 for oscillatory movement in a magnetic gap between two pole tips 51–3 of a pair of magnetic cores 51–4 surrounded by two winding coils 51–5, respectively.

As described in the referred-to Bachman patent, the core assembly of each core has also a permanent magnet 51–6 arranged so that the net output voltage generated by the two coils 51–5 of each transducer unit 50 varies in accordance with the change of magnetic flux in the respective cores of each core pair, which is caused by the movement of the flux-carrying oscillatory armature 51. The two transducer units 50 of the pickup of FIG. 12 are designed and mounted in the pickup mounting structure 20–1 for cooperation with a stylus and a stylus motion-resolving quadrangle link chain 40, which is identical with the similar quadrangle link chain 40 of the pickup of FIGS. 9, 15 and 16, described above. Each transducer unit 50 is operatively mounted in pickup mounting structure 20–1 so that coupling pins 51–7 extending from the respective oscillatory armatures 51 thereof are coupled to portions of a motion-resolving quadrangle link chain 40, similar to that described above in connection with FIGS. 9, 15 and 16.

In the pickup of FIG. 12 the coupling pins 51–7 of each armature 51 of the two transducer units 50 are drivingly coupled and seated in coupling openings of the two guide links 42–L, 42–R of the motion-resolving quadrangle link chain 40 which is connected to the stylus and the stylus rod 13 by a stylus portion 54 of the quadrangle link chain 40, as in FIGS 9, 15 and 16. Motion of the stylus 12 will cause the respective drive links 41–L, 41–R to resolve the stylus motion into two proper motion components under 45° to the record surface, which are transmitted by the two drive links 41–L, 41–R to the two guide links 42–L, 42–R, respectively, thereby imparting a corresponding motion to the coupling pins 51–7 of the respective armatures 51 which are coupled to the respective guide links, for generating in the coils of the two transducer units 50 signals corresponding to the components of the stylus motion transmitted to their respective armatures, in a manner analogous to the motion imparted by stylus 12 to the transducers 21 of the pickup of FIGS. 4 and 9, and the other forms of pickups described above.

In accordance with the invention, the two oscillatory magnetic armatures or in general the two oscillatory members of two electro-magnetic transducer units, are utilized as part of the quadrangle link chain through which the motion of the stylus of a stereophonic pickup having a stylus actuated by a 45–45 record groove or the like, is resolved into two motions corresponding to the different records recorded in the right and left channels of the record groove of a 45–45 stereophonic record, for causing the coils or windings of the two transducer units to generate corresponding signals and vice versa.

FIG. 13 shows by way of example, one manner in which the oscillatory armatures of the two electro-magnetic transducer units of a stereophonic pickup are combined with the associated stylus drive links into a motion-resolving quadrangle link chain 40–4 which resolves the motion of the stylus into proper component motions which cause the two output windings of such two transducer units to generate signal outputs corresponding to the left-channel and right-channel records of a single stereophonic 45–45 record groove.

The pickup of FIG. 13 has a pickup mounting structure 20–3 on which are operatively mounted two signal transducer units 50 similar to those described in connection with FIG. 12. Each signal transducer unit 50 has two oscillatory armatures 51 held operatively mounted to extend from their pivot supports in mutually perpendicular relation and under 45° to the record surface 11 so that oscillatory motion imparted to the coupling pins 51–7 of the respective oscillatory armatures will generate a corresponding signal voltage output in the coils 51–5 of the respective transducers 50. The two oscillatory armatures 51 and the two transducer units 50 of the pickup are combined with two drive links 41–2L, 41–2R pivotally joined to a stylus coupling portion 45–2 so as to form with the pivotally mounted armatures 51, extending from fixed pivots 51–2 of the pickup mounting structure 20–3, a motion-resolving link quadrangle chain 40–4 which causes a stylus connected to the coupling portions 45–2 of the quadrangle to actuate the two armatures for generating therein signals corresponding to the properly resolved motion components of the motion imparted to the stylus by the two channels of a 45–45 stereophonic record groove, in the same manner as in the operation of the corresponding elements of the quadrangle link chain 40 of the pickups of FIGS. 4, 9 and 12.

The two motion-resolving drive links 41–2L, 41–2R of FIG. 13 which extend under 45° to the record surface, together with the stylus coupling portions 45–2 and their pivotal junctions 44–2, are shown as formed of a single sheet of material, of nylon for instance, in the same manner as the corresponding elements of the motion-resolving quadrangle link chain 40 of FIGS. 9 and 12. The two armatures 51 of the two transducer units 50 of the pickup of FIG. 13 are pivotally joined through their coupling pins 51–7 to the guided ends of the two drive links 41–2L, 41–2R, and they form with them a stylus motion-resolving quadrangle 40–4 which resolves and isolates the motion components of a motion imparted to the stylus by the left and right channel sides of a 45–45 stereophonic record groove, in the same manner as the corresponding operation of the stylus motion-resolving quadrangle link chain of FIGS. 4, 9 and 12, described above. The two drive links 41–2L, 41–2R are mutually perpendicular and are joined to the stylus portion 45 by the flexible pivot junctions 44–2 under 45° to the record surface. The two armatures 51–1 of the two transducer units 50 extend parallel to the drive links 41–2L, 41–2R and form therewith a quadrangle, the four links corresponding in their operation to the four links 41–L, 41–R, 42–L, 42–R of the motion-resolving quadrangle link chain of FIG. 9 and the corresponding elements of the pickup of FIG. 12 and that of FIG. 4, described above. With the motion-resolving quadrangle link chain 40–2 of FIG. 13, described above, a motion imparted to stylus 12 by the left and right channel faces of a 45–45 stereophonic record groove 10, for instance in the direction of vector 11–A of FIG. 2–C, will be resolved into two motion components corresponding to vectors 11–L, 11–R which are imparted to the respective drive links 41–2L, 41–2R, and their motion is in turn imparted to the transducer armatures 51 which also form the guide links which guide the motion of the drive links 41–2L, 41–2R in proper mutually perpendicular relation and under 45° to the record surface 11, in the same manner as the corresponding elements of the pickups of FIGS. 4 and 12.

FIG. 13–A shows by way of example a pickup similar to that of FIG. 13, in which a pair of stylus-driven arms 41–2L, 41–2R, identical with those of FIG. 13, are combined with two elongated piezoelectric transducer members 21 into a motion resolving quadrangle link chain 40–6 arranged and operating in a manner analogous to the motion-resolving quadrangle link chain 40–4 of the pickup of FIG. 13, as described above.

The pickup of FIG. 13–A has two motion-resolving drive links 41–2L, 41–2R formed of a single sheet of material and pivotally connected in the same manner by pivot junctions 44–2 to a stylus coupling element 45–2 and to the stylus 12, which are identical with and operate in the identical manner as the similarly numbered parts of the pickup of FIG. 13. The two elongated piezoelectric 41–2L, 41–2R of the pickup of FIG. 13–A are combined with two elongated piezoelectric transducers 21 into a stylus motion-resolving quadrangle link chain operating in the same manner as the identical drive links of FIG. 13, to operate with the pivotally supported armatures 51 of the pickup of FIG. 13. The two elongated piezoelectric transducers 21 are perpendicular relatively to each other and are under 45° to the record surface 11, one groove of which is operatively engaged by the pickup stylus 12 for reproducing its 45–45 stereophonic records.

The movable front end of each transducer has affixed thereto a coupling pivot pin 28–6 of cylindrical shape extending with its axis parallel to the major outer electrode surfaces 22 of the respective two transducers 21. Each of the two transducers 21 has a restrained rear part mounted in a confining compartment 56–6 of the pickup mounting structure, and is held restained therein by a surrounding elastomer bias body 23, in the same way as the piezoelectric transducers 21 of the pickup described in connection with FIGS. 15–25. The motion-resolving quadrangle link chain 40–6 of FIG. 13–A will operate in the same way as that of FIG. 13, in causing the motion imparted to the stylus by the left and right channels of a 45–45 stereophonic groove record to be resolved into two mutually perpendicular motion components imparted to the two drive links 41–2L, 41–2R, which are guided by the transducer arms 21 pivotally connected in the direction of their length as they transmit the properly resolved motion components of the stylus to the transducers 21 and cause them to generate corresponding complementary stereophonic sequences, as in the similarly operating pickups of FIGS. 3–13 described above.

As shown, the two piezoelectric transducers 21 have their rear ends pivotally restrained by their elastomer bodies 23 so that they extend in directions perpendicular to their respective drive links 41–2L, 41–2R and under 45° to the record surface, and the two transducers 21 serve also as guide links for the two stylus drive links 41–2L, 41–2R to guide them in their stylus-motion-resolving operation as they drive the two guide-link transducers 21 to cause them to generate two signal sequences corresponding to the resolved motion components of the stylus, and thereby supply two stereophonically related output sequences corresponding to the right and left record channels of each stereophonic record groove played back by the stylus.

Figure 14:
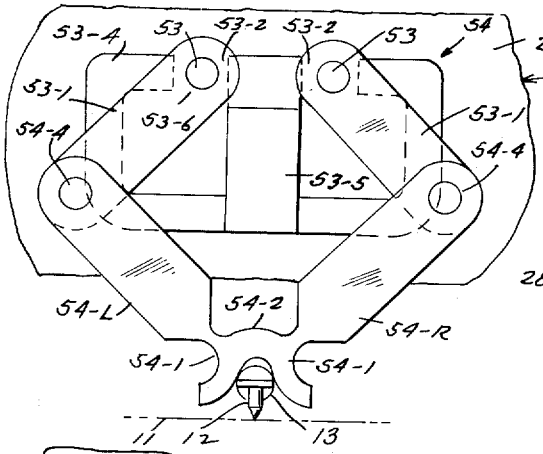
Figure 13A:
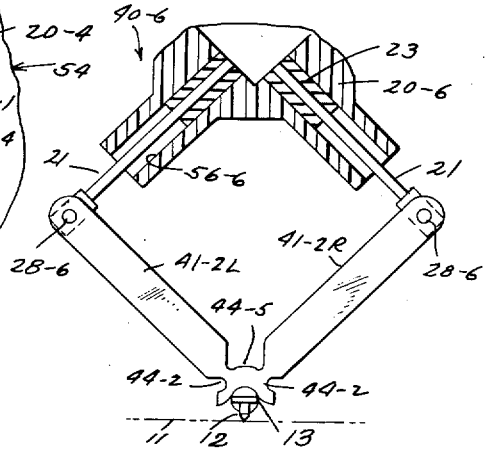
Figure 15A:
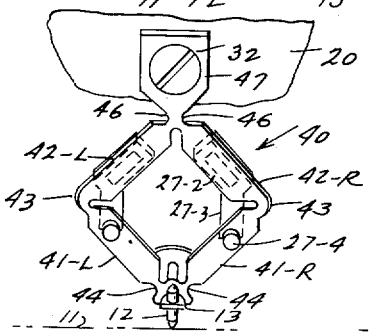
Figure 16A:
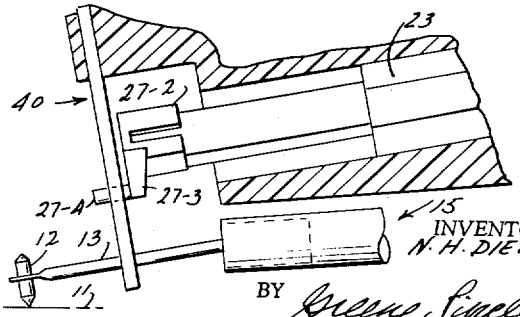

FIG. 14 shows diagrammatically, by way of example, another form of stereophonic pickup providing a stylus motion-resolving quadrangle link chain 40–5 of the invention in combination with another type of electro-magnetic transducer used in a phonograph pickup such as disclosed in British Patent 700,155 of 1953, and U.S. Patent 2,591,996 of 1952. A pickup mounting structure 20–4 has operatively mounted thereon two pin or rod-like magnetic transducer armatures 53 of two signal transducer units generally designated 54 each arranged to independently generate a signal when the respective armature 53 performs an oscillatory motion around its axis extending in a plane perpendicular to that of the figure. The opposite ends of each pin-like transducer armature 53 are suitably mounted for rotation as by a set of rubber bearings. One end of each armature has connected thereto a transversely extending oscillatory transducer arm 53–1 serving to rotate the respective armature around its axis for generating corresponding electric signals. Each transducer armature 53 oscillates around its axis within an air gap 53–2 of the respective two core loops 53–4 including a common core portion 53–5 which is common to both core loops 53–4. Each transducer armature 53 carries its own winding 53–6 extending longitudinally along the respective armature, and each core loop 53–4 provides a separate closed magnetic core circuit for the respective transducer armature 53 and its winding 53–6.

The common core portion 53–5 of the two core loops 53–4 may form a permanent magnet which induces in each armature gap 53–2 a unidirectional flux so that oscillatory rotary motion of an armature 53 will generate a corresponding signal in its winding 53–6. The two transducers 54 with their transducer armatures 53 are designed and mounted in the pickup mounting structure 20–4 for cooperation with a stylus 12 and a stylus motion-resolving quadrangle link chain 40–5. The stylus motion-resolving quadrangle link chain 40–5 of the pickup of FIG. 14 comprises two transverse oscillatory transducer arms 53–1 of the two transducer armatures 53 and two drive links 54–L, 54–R, connected through flexible pivot portions 54–1 to a stylus coupling portion 54–2 to which stylus 12 is connected.

Each stylus drive link 54–L, 54–R of the quadrangle link chain 40–5 has a guided end which is connected through pivot pins 54–4 to the oscillatory transducer arms 53–1 which provide the guide links for the respective drive links 54–L, 54–R of the stylus motion-resolving quadrangle link chain 40–5 of FIG. 14. In the pickup of FIG. 14, the quadrangle link chain portions 54–L, 54–R with the stylus portion 54–2 and their flexible pivot links 54–1, correspond to the drive links 41–2L, 41–2R, and the stylus portion 45–2 of the quadrangle link chain of the pickup of FIG. 13, wherein the quadrangle link chain is completed by the two pivotally mounted armatures 51 which correspond to the oscillatory arms 53–1 of the transducer armatures 53 of FIG. 14. Otherwise, the pickup of FIG. 14 operates in the same manner as the pickups of FIGS. 13, and 4 through 12, in resolving the motion of a stylus moving in a 45–45 stereophonic record disc into motion components imparted to the two transducer armatures 53 for generating therein signals corresponding to the records recorded in the left and right channels of each stereophonic record groove of a disc record. Thus a motion imparted to the stylus 12 by the left and right channel faces of a stereophonic 45–45 record groove, for instance in the direction of vector 11–A of FIG. 2–C, will be resolved by the guided drive links 54–L, 54–R into two motion components corresponding to vectors 11–L, 11–R, which are imparted by the respective drive links 54–L, 54–R to the transducer arms 53–1 for oscillating the respective armatures 53 and generating in their windings 53–6 complementary stereophonic signal sequences corresponding to the records represented by the left and right channel faces of the record groove 10.

The combination of elements of two electro-magnetic transducers with a motion-resolving quadrangle link chain of a pickup of the invention of the type described in connection with FIG. 14, is also applicable for use with two magneto-dynamic transducers of the type described in the Philips Technical Review, vol. 18, pages 101–109, published October 20, 1956. Thus, each of the two oscillatory armatures 53 may be formed of pin-like ferrite permanent magnet cores each mounted in the air gap of two low-reluctance magnetic core loops respectively, each having a winding surrounding the respective core loops so that a rotary motion of the respective pin-like ferrite permanent magnet cores will vary the flux passing through its core loop and thereby generate in respective surrounding windings a voltage corresponding to the oscillatory movement of the respective pin-like ferrite armatures 53. Each of the two pin-like ferrite armatures 53 has affixed to one of its pin ends a transverse oscillating arm 53–1 having a coupling pin seated in coupling driving engagement with the two drive links 54–L, 54–R, respectively, of the motion-resolving quadrangle 40–5, in the same manner as described above in connection with corresponding elements of FIG. 14.

Instead of utilizing the oscillatory transducer arms 53–1 of the two transducers 54 as parts of the motion-resolving quadrangle 40–5 in the way described in connection with FIG. 14, the two transducer arms 53–1 may be coupled with their coupling pins 54–4 to two lateral links of a motion-resolving quadrangle 40 such as shown in FIG. 12, in the same manner as described in connection with its two electro-magnetic transducers 50 having two oscillatory magnetic armatures the coupling pins 51–7 of which are couplingly seated in coupling openings of either the two guide links 42–L, 42–R, of the quadrangle link chain 40, or in similar coupling openings in its two drive links 41–L, 41–R, corresponding to the coupling connections of the transducer coupling pins 28 in FIG. 9.

FIGS. 15–29 show a pickup of the invention based on the principles described above, in a form in which it is manufactured on a mass-production basis. It has two mechano-electric transducers 21 of the type described above. The forward end of each transducer 21 is subjected by the stylus 12 to oscillatory movement in a direction perpendicular or transverse to its major outer or electrode surfaces 22. The rearward part of each transducer 21 is shown restrained in its motion by a body of elastomer material 23 held confined in its operative position by a relatively fixed, rigid mounting structure 20 of the pickup (FIGS. 16, 20–22). The elastomer body 23 of each transducer forms an integral body having a slot in which is embedded under pressure the restrained or biased rearward region of the piezoelectric transducer 21 which is surrounded on all sides by the integral elastomer bias body 23. This feature of the invention constitutes the subject-matter of the co-pending application Norman H. Dieter, Serial No. 733,614, filed May 7, 1958, and now abandoned. The movable front end of each transducer 21 has secured thereto a coupling member or coupling pin 28 through which it is coupled to the motion-resolving quadrangle link chain 40, and therethrough to the stylus 12, as explained above. The stylus coupling member or pin 28 has a mounting portion 27 with a compartment in which the movable front end of the transducer 21 is seated. The mounting compartment of the transducer coupling pin 28 has dimensions so that it fits over the exterior surfaces of the forward end of the piezoelectric transducer 21 and is suitably secured thereto as by cement so that the coupling pin 28 forms a fixed, integral part of the transducer 21.

Each transducer 21 with its elastomer bias body 23 is held in its proper operative condition by the pickup mounting structure 20 which, in the form shown, constitutes a relatively rigid housing for each of the two transducers 21 (FIGS. 16, 20–22). The pickup housing 20 has two transducer bias compartments 56, one for each of the two transducers 21, within which the bias body 23 of the respective transducer 21 is held compressed. The transducer housing 20 has at its front end, as seen to the left of FIGS. 22–24, a front wall 57, and it has two side walls 58 projecting beyond the front wall 57 and bounding with other frontwise facing housing wall portions a relatively wide front compartment 59 into which the coupling end portions 28 of the two transducers project, and in which is also held the motion-resolving quadrangle link chain 40 through which the transducer is connected to the styli 12. The front surface 57–1 of the front housing wall 57 lies within the front compartment 59 and has secured and affixed thereto, as by a screw or rivet 32, the anchor portion 45 of the motion-resolving quadrangle link chain 40. The upper section of front housing wall 57 overlies the coupling end portions of the transducers 21 and holds the motion-resolving quadrangle link chain 40 in a plane parallel to its front surface 57–1 so that the coupling pins 28 of the two transducers have proper coupling and driving seating engagement with the coupling openings of the two opposite side links of the quadrangle link chain 40. In the form of pickup shown in FIGS. 20–25, the coupling pins 28 of the two transducers are drivingly seated in seating openings of the two guide links 42–L, 42–R as seen in FIG. 21.

The two housing compartments 56 through which the major part of the length of the two transducers 21 extends, and in which the two elastomer bias bodies 23 of the two transducers are held confined, are shown to be of hexagonal shape, as seen in FIGS. 20 and 21. In its released uncompressed condition shown in FIG. 22–A the elastomer bias body 23 has body portion 23–1 of substantial thickness overlying the major transducer surfaces 22. The two housing compartments 26 have such dimensions that when the bias elastomer body 23 with the transducers 21 embedded therein are inserted into the respective housing compartments 56, the thicker bias body portions 23–1 are compressed against the larger transducer faces 22 of the respective transducers and thereby apply thereto the proper biasing forces for securing generation of the desired voltage output when the respective transducer is flexed in a direction transverse to its major surfaces 22. As seen in FIG. 22, only the rearward part of the length of the transducers 21 extending through the bias housing compartments 56 is surrounded by the bias body. A length of each transducer 21 extending frontward beyond the front surface of the bias body 23, is free be flexed within the surrounding open space of the as housing compartment 56 when flexing forces are applied to its movable forward coupling pin 28.

As used herein, the "front" or "forward" part of the ickup, means the pickup part at which the styli 12 are onnected through the motion-resolving quadrangle link ain 40 to the coupling front ends 28 of the two transucers 21, and the "rear" or "rearward" part of the pickp means its opposite end part.

Referring to FIGS. 22, 23 and 25, the intermediate part f the pickup housing 20–1 in which the two transducer asing compartments 56 are located, has a rearwardly icing wall 61–1 which together with the adjoining rearard housing side walls 61–2 provide a terminal junction ousing section 61. The terminal junction housing seon 61 has a terminal junction compartment 61–3 rough which the contact ends 62–1 of four metallic rminals strips 62 are placed in contact engagement with e two pairs of outer electrode surfaces 22 of the two ansducers 21 extending along and coinciding with their ajor outer surfaces 22. The rearward ends of transucers 21 together with the rearward ends of the elonated transducer biasing bodies 23 terminate and are exosed along the wall 61–1 of the terminal junction comartment 61–3 into which the transducer biasing compartents 23 lead.

The terminal junction housing part 61 is adjoined y a narrower rearwardly extending terminal housing art 64 having a terminal retainer section 64–1 and a rminal locking section 61–5 extending between the reltively higher side walls 61–2 of the rearward part of e pickup housing 20. The interior spaces of the terinal housing part 64 are enclosed on all sides except or their open top side, as seen in FIGS. 22, 23 and 25, that their interior compartments and retainer spaces re open and accessible through the top side of the housg 20. At the upwardly facing rearward region adjoing the side walls of the terminal housing part 64, its rminal retainer part 64–1 has two outer, upwardly pening, narrow retainer slits 64–2 shaped to receive ith a retaining fit and hold therein, retainer sections 2–2 (FIG. 22) of the two terminal strips 62, leading to e two outer electrode surfaces of the two transducers 1. As seen, the major part of each metallic terminal trip 62 extends with its flat surface in a vertical or ownward plane as seen in FIGS. 22, 25, so that its verical retainer sections 62–2 may be inserted through the pen top side into the retainer slits 64–2 of the retainer ousing part 64–1.

The upwardly facing region of the terminal mountg housing part 64 extending between its two outer rminal retainer slits 64–2, has a wider terminal retaing gap space 64–3 of the same vertical depth as the wo border slits 64–2 for receiving similar terminal strip etainer sections 63–2 of the two inner terminal strips 2 extending therethrough from the inward electrodes f the two transducers 21. A spacer block of the same epth as the wide gap space 64–3 but of a width smaller y the thickness of two terminal strips than the width f the gap space 64–3, is positioned in this gap space 4–3 to fill its gap space after the retainer sections 62–3 f the two inner terminal strips 62 have been placed in he gap space 64–3, either in the position indicated by he full-line inner terminal strips 62, or with one of the wo inner terminal strips 62 shown in their dash-line osition 63–2. The depth of the narrow retainer slits 4–2 and of the wider retainer gap space 64–3 is equal o the height of the retainer sections 62–2 of the respecive terminal strip 62. The upper edges of the generaly flat metallic terminal strip 62 extending rearwardly hroughout the length of the locking part 64–8 and reaining part 64–1 of the terminal housing part 64 and eyond, lie all at the same level as the intermediate housng body portions of the rearward terminal retainer section 64–1 extending between the higher side walls 61–2 thereof, and containing the retainer slits and retainer gaps 64–2, 64–3 within which the retained sections 62–2 of the four terminal strips 62 are immovably retained within the terminal housing part of the pickup housing 20.

Each terminal strip 62 has an outer terminal end 62–3 through which external circuits are connected to the two pairs of electrode surfaces 22 of the two transducers 21. Each terminal strip 62 also has a locking section 62–3 extending forwardly from its retainer section 62–2 and provided with a locking recess shaped to have a locking fit over a generally rectangularly shaped locking projection or boss 61–6 of the locking housing section 61–5 of the terminal housing 64. The locking boss 61–6 of the locking housing section 61–5 extends across its entire width between the higher side walls 64–1 of the terminal housing 64 and gives this part of the housing substantial strength. The upper surface of this locking boss 64–9 is at a lower level than the adjoining body portions of the retainer housing portion 64–1 to provide for the height of the locking section 62–3 of the terminal strips 62 extending thereover and held locked thereby.

From a downward forward edge portion of the locking section 62–3 of each terminal strip 62, extends forwardly the forward contact end portion 62–1 of each terminal strip 62, which makes contact and provides the connection to the respective pairs of electrode surfaces 22 of each of the two transducers 21. The forward contact end portions 62–1 of each terminal strip are flat and are twisted from the vertical plane of the terminal strip portions extending through the length of the terminal housing 64, so that these flat terminal contact end portions 62–1 lie in the same plane as the major electrode surfaces 22 of the respective two transducers 21. The flat contact end portions 62–1 have a smaller width than the electrode surfaces 22 of the transducers 21 with which they are held in contact by the compressed body portions of the elastomer bodies 23 surrounding the rearward ends of the two transducers 21 having rearward end surfaces which are exposed to the housing compartment 61–3. The terminal-junction housing compartment 61–3 provides sufficient space for enabling insertion of the forward twisted contact end portion 62–1 of each terminal strip 62 into contact engagement between the respective outer electrode surfaces 22 of each transducer 21 and the surrounding overlying body portions 23–1 of their elastomer bodies 23 as they are held compressed and mounted in the rearward section of each transducer bias compartment 56 of the pickup housing 20. After so placing the contact end portions 62–1 of each terminal strip 62 in compressed contact engagement with the rearward end regions of the electrode surfaces 22 of the two transducers 21 while the rearwardly extending length of the terminal strip 62 is held under an angle relatively to the upwardly facing surface of the terminal housing part below it, each terminal strip 62 is lowered to its downward position in which the locking recess of its lock portion 63–1 is engaged by the locking boss 61–6 and the retainer portion 62–2 of each terminal strip is fully inserted into the respective slit space of the retainer slits and retainer gaps 64–2, 64–3 of the terminal housing section 64.

After so placing the four terminal strips 62 in their operative contact engagement with the electrode surfaces 22 of the two transducers 21, and in their locked retained positions over the locking boss 61–6 and within the retaining slits and retaining gaps 64–2, 64–3 of the terminal housing part 64, they are retained and fixed in their operative position shown, by an overlying cover structure consisting of a relatively rigid cover plate and an underlying cover pad 65–9 of rubber or elastomer material which are held pressed against the upper edges and surfaces of the above-described underlying assembly of terminal strips and terminal housing body portions, by an overlying clamping structure 66 having two clamping arms 66–1 held clamped to the side walls of the terminal housing section 64 as by the heads of a rivet 66–3 extending through holes of the two clamping arms 66–1 and a coaxial retainer hole 61–7 through the locking boss 61–6 of the terminal housing section 64.

The rubber cover pad 65–9 is of such thickness that when the clamping arms 66–1 of the overlying clamping plate 66 are affixed by rivet 66–3 to the terminal housing section 64, the overlying rigid cover plate 65 will maintain the rubber pad 65–9 compressed against the underlying edges of the terminal strips 62 which are retained in the retaining slits 64–2 and in the slits of the retaining gap 64–3 of the retaining portion 64–1 of the terminal housing section 64 with the upper edges of each terminal strip locking portions 62–3 also held pressed into locking engagement with the upwardly facing surface of the underlying locking boss 61–6 interlockingly seated in the locking recess of the overlying terminal strip locking portion 62–3.

To simplify ready positioning of the rigid cover 65 in its proper alignment relatively to the underlying portion of terminal housing section 64, its forward part has a generally rectangular locking nose 65–1 shaped to interlockingly fit against the upper edge region of wall surfaces 61–1, 61–2 bounding the generally rectangular forward part of the terminal junction compartment 61–3 of the terminal housing 64 (FIGS. 22, 23). The clamping plate structure 66—with which the rigid cover 65 is held clamped under pressure over the underlying rubber pad 65–9 and the terminal strip assembly within the terminal housing 64—is formed of two overlapped sheet metal portions with the outer overlapping sheet portion having extending therefrom the two sheet metal clamping arms 66–1 with which the clamping sheet structure 66 is held clamped under pressure over the underlying rigid and rubber cover elements 65 and 65–9. The side walls 61–2 of the terminal housing part 64 have a somewhat smaller thickness in the region extending above the level of the terminal-strip-retainer housing part 64–1 (FIG. 25) so as to provide shoulder portions 61–8 which will be engaged by the edges of the rubber cover pad 65–9 when it is placed in its position and when held compressed by the overlying downwardly clamped rigid terminal housing cover 65.

The terminal housing part 64 is of smaller width than its rigid cover plate 65, so that the side edges of the rigid cover plate 65 project beyond the side walls of the terminal housing part 64. The two clamping arms 66–1 of the sheet-metal cover clamping structure 66 provide two laterally projecting clamping arm portions 66–2 bent into V-shape, which extend in contact over the top and bottom surfaces of the laterally projecting side edges of the cover plate 65, thereby providing for interlocking engagement between the two side edges of the rigid cover plate 65 and the two V-bent claimping side arm portions 66–2. This makes possible the sub-assembly of the cover plate 65 and the sheet clamp 66 into a composite, cover-clamp unit, which is placed as a unit over the terminal housing part 64 with the assembly of terminal strips 62 in their interlocked and retained positions therein, whereupon it is merely necessary to compress the assembly of the cover-clamp unit and the terminal housing part 64 to the position where the holes of the sheet clamping arms 66–1 are aligned with the terminal housing hole 61–7 and unite them by a rivet or screw secured within the holes of the aligned assembly of the housing part 64 with its terminal strips 62 and cover plate 65. Since the rubber pad 65–4 fits against the shoulders along the side walls 61–2 of the terminal housing part 64 and the rigid cover plate 65 has an aligning nose 65–1 which has a drop fit into the entry region of the wider forward part of the terminal-junction-housing compartment 61–3, the housing cover and clamp parts fall into their proper assembly positions when they are brought against each other, thereby providing a simple and foolproof assembly operation which may be carried on automtically or by unskilled labor.

The stylus 12 may be affixed to the stylus portion of the motion-resolving quadrangle link chain of the pickups of the invention described above, for instance, to the stylus portion 45 of the motion-resolving quadrangle link chain 40 described above in connection with FIGS. 9 and 15 through 24. The stereophonic pickup of the invention shown in FIGS. 15–25, is designed to permit ready interchange and replacement of the stylus 12 in its operative position on the pickup mounting structure or its housing 20. To this end, as shown in FIGS. 15, 16, and 20–25, the stylus portion 45 of the motion-resolving quadrangle link chain 40 of the pickup is provided with a coupling recess 45–1 for holding drivingly coupled therein the forward end of a thin, light stylus rod 13 carrying one, or two differently directed, styli 12. The rearward portion of the thin, light stylus-carrying rod 13 is provided with a readily grippable, relatively thick stylus grip and seating member 14 by which the thin stylus-carrying rod 13 may be readily gripped with the fingers of the user for attaching it to the pickup mounting structure or housing 20.

FIGS. 15–19 and 21–25 show how a pickup of the invention may be provided with a detachable, turnable stylus support rod which permits turning the stylus rod so as to bring a finer or less fine stylus into operative engagement with a record groove to be played, and also permitting easy detachable exchange and replacement of such stylus drive rod into and out of its operative position on the pickup mounting structure or housing. The terminal housing part 64 of the pickup of the invention shown in FIGS. 15–19 and in detail in FIGS. 20–25, has the same width as the phonograph pickups playing back with only one transducer, a single record recorded on a record groove, and having a detachable stylus-carrying rod which may be turned around its axis for bringing either of two styli into operative groove-engaging position. As an example, the pickup has secured to the relatively narrow terminal housing part 64 a turnover stylus guide structure 70 (FIGS. 26, 27) whch is identical with that disclosed and claimed in the Michalko et al. Patent 2,881,005.

The stylus guide structure 70 of the pickup of FIGS. 18, 19 and 20–25, and shown in detail in FIGS. 26–28, is formed of elastic sheet metal such as steel, which is bent into U-shape, and having two side arms 71, 72 secured to the side walls of the terminal housing section 64 by rivet 66–3. The guide sheet structure 70 has an intermediate elongated seat region 74 extending transversely between its two side arms 71, 72. The seat region 74 has a cut-out retainer tongue 75 extending from a transverse edge of a sheet opening formed in sheet guide structure 70. The sheet opening is bordered by two opposite seating sections of the intermediate seating region 74 of the sheet guide structure 70. Each of the two border seating sections 81 of sheet metal guide member 70 adjoining its opening has a bent reentrant seat portion which provides two rotary bearing seats for an intermediate cylindrical region 14–1 of stylus rod mounting member 14 for rotatably holding the stylus rod 13 in operative position on the pickup 20. The retainer tongue 75 of the stylus guide sheet structure 70 is stiffened by a longitudinal rib deformation 76–1 and is elastically biased by its arcuate elastic rear junction portion 77 so as to be pressed or urged by its elastic restoring forces toward the central seating region 14–1 of the stylus rod mounting member 14 for holding it in its operative position shown in FIGS. 15, 16, 22–25, within the seating section 81 of guide sheet structure 70.

The outwardly curved junction portion 77 of the retainer tongue 75 of guide sheet structure 70 is designed to store therein sufficient elastic restoring energy to permit outward flexing of the retainer tongue 75 for enabling removal of the seating section 14–1 of the stylus rod mounting member 14 from the reentrant seat portions 82 of the sheet guide structure 70 or for replacing a given stylus rod unit 14 with another similarly seated stylus rod unit 14, which is similarly held and retained in operative position against the reentrant seats 81 of the sheet guide structure 70. The downward edge portions of the two guide structure side arms 71, 72 which face toward the rear of the pickup (as seen in FIGS. 26 and 28), have downward stop extensions 85 which are engaged by the lateral turn arm 14–2 of the stylus rod mounting member 14 whenever it is turned with its two styli 12 to either one of the two stylus positions, in one of which it is shown in FIGS. 15, 16, 23 and 24. An eccentrically offset arcuate intermediate bias portion 14–3 of the seating region 14–1 of the stylus rod mounting member 14 is engaged by the rib 76–1 of stylus-rod retainer tongue 75, which is elastically biased so that when the stylus mounting rod 14 is turned by its lateral grip 14–2, from one stylus position to an opposite stylus position, past an intermediate neutral position, the engagement of the retainer tongue 75 with the eccentric stylus rod seating portion 76–1 brings the stylus drive rod 13 automatically from one stylus position to the opposite stylus position.

The bottom wall 20–3 of the pickup housing (FIGS. 21, 22, 24) is provided with a stylus rod guide projection 20–4 having along its downwardly facing side (as seen in FIG. 22) a V-shaped guide seat recess 20–5 within which a forward portion of the cylindrically shaped stylus rod mounting member 14 is rotatably held in its operative position on the pickup and to assist in guiding it in such operative position when the stylus rod mounting member 14 is turned around its axis while rotatably seated on the pickup as it is being turned from one stylus position to the other stylus position.

The heads of the rivet 66–2 which secure the two side arms 71, 72 of the stylus rod guide structure 70 to the side walls of the rear housing part 64 of the pickup, also serve to clamp to this housing part 64 the two side arms 66–1 of the sheet metal cover 66 which holds clamped thereto the housing cover wall 65 overlying and holding fixed therein the four terminal strips 62. The relatively rigid sheet-metal cover 66 which is secured by its two riveted cover arms 66–1 to the rear part 64 of the pickup housing 20 has a forward bracket extension 66–5 by means of which the pickup is secured, as by two screws 67–3, to downwardly projecting mounting bosses 67–2 of a tone arm 67 having one end (not shown) pivotally mounted, for instance, on the conventional support of a conventional disc-type phonograph turntable. The opposite side edges of the relatively rigid pickup bracket 66–5 (FIGS. 18, 19) which are wider than its rearward sheet cover part 66, have two recessed mounting holes 66–6 for receiving the shanks of two mounting screws 67–3 by means of which the bracket 66–5 is secured to the overlying end faces of the tone arm mounting bosses 67–2. The cover bracket 66–5 which is held affixed by screws 67–3 to the tone arm 67 is joined to its cover wall portion 66 by an elastically compliant junction portion 66–7 which serves as a compliant, elastic spring connection between the pickup housing 20 and the tone arm 67.

In practice, the narrower, rigid cover portion 66 and the wider rigid bracket portion 66–5—which are cut with their intermediate spring junction 66–7 as an integral sheet blank of a single thickness of spring sheet metal—are given the required rigidity by forming the cover portion 66 and the bracket portion 66–5 of doubled-over sections of the sheet metal structure out of which they are cut, while the spring junction 66–7 extending between them is formed only of a single layer of the elastic sheet metal. In addition, a slot 66–8 is cut out along an intermediate part of the width of the spring metal junction 66–7 of the cover-bracket sheet structure 66 so that the spring junction 67–2 forms two spring side arms extending between the relatively rigid cover section 66 and its rigid bracket section 66–5. This makes it possible to proportion the width of the two spring junction arms 66–7 of the sheet metal cover-bracket structure 66 so that it has the desired compliance as a part of a filter system which filters out and keeps away from the pickup, vertical rumble vibrations transmitted by the turntable. Such vertical rumble-filter system does not form part of the present invention, but constitutes the subject-matter of the copending application of Harry A. Pearson, Serial No. 740,622, filed June 9, 1958, concurrently with the present application.

The front surface 57–1 of the front wall 57 of the pickup housing 20, along which the motion-resolving quadrangle 40 is mounted and along which the coupling pin end portions 28 of the two transducers 21 project into coupling engagement with the motion-resolving quadrangle link chain 40, has applied thereto a thick layer—indicated by dash-line 57–4—of high-viscosity silicone oil containing an inert particle filler dispersed therein. The high-viscosity silicone oil 57–4 is of the type disclosed and claimed in the co-pending Smith-Johannsen application Serial No. 605,308 referred to above, and it will be retained in position along the surfaces of the pickup structure to which it has been applied, without leaking, draining, or flowing away from the surface to which it has been applied, by the action of gravity forces, unless deliberately removed by application of removing forces thereto.

The front compartment 59 of the pickup structure 20 which extends between its front side walls 58, is enclosed on almost all sides thereof by a front cover sheet member 88 of any suitable, strong, elastic material, as seen assembled on the pickup in FIGS. 17, 19, 22, 23, and shown in detail in FIGS. 29–31. The elastic front cover sheet 88 may be formed of elastic sheet metal which is bent into U-shape with an intermediate front wall section 88–1 and two arms forming a top wall section 88–2 and a bottom wall section 88–5 for the housing front compartment 59. The front side walls 58 of pickup housing 20 (FIGS. 17, 19, 21–24) are somewhat thinner adjacent their border edge regions to provide along their inwardly facing wall surfaces the shoulder ledges 58–2 against which the side edges of the elastic cover sheet are held clamped by the elastic restoring forces of the cover sheet 88, the outer surface of which is slightly recessed behind the edge surfaces of the front side walls 58. In their released condition, the top wall section 88–2 and bottom wall section 88–5 of the elastic sheet cover 88 are closer to each other than in the elastically deformed farther-away position in which they are held clamped by their elastic restoring forces to wall shoulders 58–2 of the inwardly facing wall surfaces of the two side walls 58 of the pickup front compartment 59. The wall shoulders 58–2 of the two side walls 58 of the pickup front compartment 59 are at sufficiently lower level than the outer edge boundary surfaces of the two compartment side walls 58, so that the edges of the cover sheet 88 fit between the border edges of the housing side walls 58 which project outwardly behind the wall shoulders 58–2, as seen in FIGS. 21–24.

The top wall section 88–2 of the front cover sheet 88 terminates in a narrower central grip tongue portion 88–3 projecting beyond the rearward border of the pickup-housing front wall 57 and is held by the elastic restoring forces of cover sheet 88 against the upper surface of the pickup housing front wall 57, as seen in FIG. 22. In addition, the opposite side edges of the wider front part of the top cover sheet section 88–2 have two lateral locking projections 88–4 which are interlockingly engaged within locking recesses 57–6 formed along the upper border regions of the front housing side walls 58 so as to hold the top cover sheet section 88–2 interlocked with these housing side wall regions when placed in position thereon, as shown in FIGS. 18, 19 and 22–24. The bottom wall section 88–5 of the front cover sheet 88–1 is formed by two relatively wide side tongues each terminating in rearwardly narrower end tongues 88–6 and separated by an opening or slot 88–7 through which the stylus portion 45 of the motion-resolving quadrangle link chain 40 in the front housing compartment 59 projects downwardly for driving coupling engagement with the thin stylus rod 13 which is operatively carried by the stylus mounting and guide structure 70 of the rear housing wall 64.

Near their downwardly facing edge surfaces, the inward faces of the two front housing side walls 58 have formed therein two locking slits 58–6 shaped for seating and retaining therein the side tongues 88–6 of the bottom wall arm 88–5 of the front cover sheet 88 for retaining it therein while the upper cover sheet arm 88–2 is elastically flexed outwardly and pushed with its two locking tongues 88–4 over the upper edge surfaces of the front side walls 58 until the side locking tongues 88–4 of the cover wall sheet section 88–2 drop into the locking recesses 58–6 on the upwardly facing edge surfaces of the two front-compartment housing side walls 58. With this arrangement, the sheet cover wall 88 may be attached to the housing 20 in its operative position shown in FIG. 22 as the final step of the assembly, as follows: After first inserting the side arm tongues 88–6 of the bottom arm sections 88–2 of sheet cover 88 into the retainer slits 58–6 of the front housing side walls 58, the upper part of the front cover sheet section 88–1 is pushed rearwardly until its side locking tongues 88–4 riding along the upper edge surfaces of the front housing side walls 58 drop into its interlocking recesses 58–6, thereby interlocking the front compartment cover sheet 88 in its operative position between the front compartment side walls 58, as seen in FIGS. 22–24.

The entire assembly of the pickup of the invention is thus performed with only two rivets or screws. One rivet or screw serves to secure the anchor portion of the motion-resolving quadrangle link chain to the front wall 57 of the pickup mounting structure or housing 20. A single other rivet or screw serves to secure the narrower housing part 64, the turnover stylus guide structure 70, as well as the terminal housing section clamping wall 66, with its rumble-filter spring bracket connection to the tone arm. The front sheet cover 88 may be readily removed from its operative position between the front compartment side walls 58, by gripping, as with a finger, the central grip tongue 58–3 of its upper cover walls, and flexing it outwardly for releasing its locking side tongues 88–4 from the shoulders of the two interlocking recesses 58–6 of the front compartment side walls 58. Thereupon the front wall 88–1 of front compartment cover sheet 88 is tilted in forward direction relatively to its bottom cover wall arms 88–6 until the cover sheet top wall 88–2 is released from the upper edges of the cover side wall, whereupon the two tongue arms 88–8 of the cover sheet bottom wall 88–5 may be withdrawn from the retainer slits 58–6 in the front compartment side walls 58 (FIG. 20).

In the pickup described above in connection with FIGS. 15, 16 and 17–19, the two transducers have movable coupling ends 28 which are drivingly coupled to an intermediate portion of the two guide links 42–L, 42–R, respectively, of the motion-resolving quadrangle link chain 40 of the invention. If it is desired to couple the movable transducer ends of the two transducers 21 to the two drive links 41–L, 41–R of such motion-resolving quadrangle link chain 40, the two drive links have to be made of greater length than shown, to provide the pickup mounting structure with space for operatively mounting therein the transducers 21 so that a transducer coupling pin of each transducer 21 may be seated in coupling driving engagement within a coupling opening of the respective two quadrangle links 21–L, 21–R. This in turn requires enlargement of the width of the pickup mounting structure.

In accordance with a phase of the invention disclosed herein, the two transducers 21 may be held operatively mounted in a rigid pickup mounting structure of the same small dimensions and the same closing spacing as described above in connection with the pickup of FIGS. 15, 16 and 17–29, while providing for a direct coupling connection between the movable front ends of the two transducers 21 and the two drive links 41–L, 41–R of a motion-resolving quadrangle 40 identical with that described in connection with the pickup of FIGS. 17–31.

FIGS. 15–A and 16–A show how to provide a pickup of the type described in connection with FIGS. 15, 16 and 17–29, with a direct transducer coupling connection to the two drive links 41–L, 41–R of an identical motion-resolving quadrangle chain 40. The various elements of the pickup shown in FIGS. 15–A and 16–A, except as otherwise set forth below, are identical with the corresponding elements of the pickup shown in FIGS. 15 and 16. It differs therefrom in the following respects: The movable front ends of each transducer 21 have affixed thereto as by cement, a rigid coupling pin compartment 27–2 similar to the rigid coupling compartment 27 of FIGS. 15, 16 and 17–29. Each coupling compartment 27–2 of the transducers 21 of FIGS. 15–A, 16–A, is provided with a downwardly extending arm 27–3 carrying a forwardly projecting coupling pin 27–4 arranged and shaped to enter into and establish a positive driving connection of the respective transducers 21 with a coupling opening of the respective drive links 41–L, 41–R of the motion-resolving quadrangle 40 of the pickup, for cooperation in the same manner as explained above for the corresponding elements, in connection with FIGS. 9 and 15, 16. Otherwise, the construction and operation of the pickup of FIGS. 15–A and 16–A is identical with that described above in connection with FIGS. 15, 16, and 18–29.

In the co-pending application of the present applicant, Serial No. 740,621, filed simultaneously with the present application and assigned to the same assignee, there are claimed the structural features of the spring connection support between the pickup and the tone arm which forms with their mass a filter for cutting off the pickup response to undesirable low-frequency rumble vibrations. In the co-pending application of Harry A. Pearson, Serial No. 740,622, filed simultaneously with the present application and assigned to the same assignee, are claimed the broad features of the combination of spring connection between the pickup and the tone arm, which forms with their masses a filter for cutting of pickup response to undesirable low frequency rumble vibrations.

It will be apparent to those skilled in the art that the novel principles of the invention disclosed herein in connection with specific exemplifications thereof, will suggest various other modifications and applications of the same. It is accordingly desired that in construing the breadth of the appended claims, they shall not be limited to the specific exemplifications of the invention described above.

I claim:

1. In a phonograph pickup device for playing back a record groove containing two different record undulation sequences extending along different transverse segments of the groove, a stylus arranged to engage the record groove and to be driven by both its undulation sequences, and a moving system including at least two mechano-electric transducer elements each having a motion-transmitting connection to said stylus and operative to transduce transmitted motion of said stylus into electric signals, a mounting structure carrying said moving system and said stylus in their operative positions and supporting said stylus for vibration simultaneously in two different transverse planes, said moving system having two relatively rigid drive links, one for each transducer element, with each drive link extending in a different direction from and having a pivotal motion-transmitting connection to said stylus for transmitting motion of said stylus to its transducer elements and a guided portion at a distance from said stylus, two distinct elements of said moving system forming two relatively rigid guide links with one guide link for each drive link having a pivot portion pivotally connected to the guided portion of its drive link and a further pivot portion pivotally connected to said mounting structure, said two drive links and said two guide links constituting a link chain of at least four pivotally connected motion-transmitting links extending from said stylus and operative to confine the motion of each drive link to a distinct direction irrespective of the amplitude of motion transmitted therethrough to its transducer by said stylus,

*said two rigid drive links and said two rigid guide links constituting four movable links of an endless link chain formed of a single original structure, said two transducer elements constituting distinct structures in addition to said four links of said link chain.*

2. In a pickup device as claimed in claim 1, the further pivot portion of each of said two guide links being pivotally connected to two spaced portions of said mounting structure, *having a pivot connection to an adjacent portion of said mounting structure.*

3. In a pickup device as claimed in claim 1, said two guide links extending transversely to each other.

4. In a pickup device as claimed in claim 1, [said four pivotally connected links forming sections of a common integral structure],

*said four links of said endless link chain being formed of a single original structure, said two transducer elements constituting distinct structures in addition to said four links of said link chain,*

*said link chain having a stylus coupling portion connected to said stylus and disposed diametrically opposite to said pivot connection,*

*said stylus forming part of a detachable support, said stylus coupling portion having a recess for detachably receiving and coupling thereto said stylus support.*

[5. In a pickup device as claimed in claim 1, said four pivotally connected links forming link sections of a common integral link structure with all links pivotally joined into an endless link chain.]

[6. In a pickup device as claimed in claim 1, said two drive links forming sections of a common integral link structure.]

7. In a phonograph pickup device for playing back a record groove containing two different record undulation sequences extending along different transverse segments of the groove, a stylus arranged to engage the record groove and to be driven by both its undulation sequences in different transverse planes, and a transducer system including at least two mechano-electric transducer elements each having a movable transducer drive portion through which the motion of the stylus is transmitted to the respective transducer element, a mounting structure carrying said two transducer elements in their operative position so that their drive portions may be driven by said stylus, a coupling link structure connecting said two transducer drive portions to said stylus and supporting said stylus for vibration simultaneously in said different planes in accordance with corresponding different motion components of said stylus, said link structure comprising a chain of at least four link arms and arm junctions pivotally joining adjacent ends of said link arms into an endless link chain, a driving connection from said stylus to one arm junction of said endless link chain for transmitting the driving motion of said stylus in said different planes to the two link arms extending from said one stylus-driven arm junction, the opposite ends of said two link arms extending from the stylus-driven arm junction being connected to the respective transducer drive portions of said two transducer elements for generating therein distinct signal sequences corresponding to the distinct component motions of the stylus, in the respective different planes,

*said four links of said endless link chain being formed of a single original structure, said two transducer elements constituting distinct structures in addition to said four links of said link chain,*

*said link chain having a stylus coupling portion connected to said stylus and disposed diametrically opposite to said pivot connection,*

*said stylus forming part of a detachable stylus support, said stylus coupling portion having a recess for detachably receiving and coupling thereto said stylus support.*

8. In a phonograph pickup device as claimed in claim 7, said link chain having only four of said link arms joined by said arm junction into said link chain.

[9. In a pickup device as claimed in claim 7, a portion of each of the respective two transducer elements forming at least a part of said links chain through which said transducer elements are connected to said stylus.]

[10. In a pickup device as claimed in claim 1, a portion of each of the respective two transducer elements forming at least part of said link chain through which said transducer elements are connected to the stylus.]

[11. In a pickup device as claimed in claim 1, a portion of each of the respective two transducer elements forming one link of the link chain through which said transducers elements are connected to said stylus.]

[12. In a pickup device as claimed in claim 1, said mounting structure supporting said stylus for vibration in two transverse planes forming equal angles with the axis of said stylus.]

[13. In a pickup device as claimed in claim 12, said two drive links extending in different directions from and under equal angles to the axis of the stylus.]

[14. In a pickup device as claimed in claim 13, said two guide links extending in different directions relatively to and under equal angles to the axis of the stylus.]

[15. In a pickup device as claimed in claim 14, said two guide links forming with said two drive links a chain with two pairs of parallel opposite links.]

[16. In a pickup device as claimed in claim 1, said mounting structure supporting said stylus for vibration in two transverse planes forming equal angles with the axis of said stylus, said two drive links extending in different directions from and under equal angles to the axis of the stylus, said four pivotally connected links forming sections of a common integral link structure.]

[17. In a pickup device as claimed in claim 1, said mounting structure supporting said stylus for vibration in two transverse planes and forming equal angles with the axis of said stylus, said two drive links extending in different directions from and under equal angles to the axis of the stylus, said four pivotally connected links forming link sections of a common integral link structure with all links pivotally joined into an endless link chain.]

18. In a pickup device as claimed in claim 1, said stylus forming part of an elongated drive member detachably held by said mounting structure, said link chain having a coupling portion arranged to detachably engage an element of said drive member for coupling said stylus to said drive links and therethrough to said transducers when said drive member is connected to said mounting structure.

19. In a pickup device as claimed in claim 18, said coupling portion being relatively rigid and having pivotal connections to the two drive links which constitute the pivotal connections of said drive links to said stylus.

20. In a vibration transducing device, a stylus arranged to cooperate with a record member operating with groove undulations representing a record, a transducer system including at least two mechano-electric transducer elements each having a motion-transmitting connection to said stylus and operative to transduce mechanical motion transmitted between the stylus and the respective transducers into electrical signals, a mounting structure carrying said transducer system and said stylus in their operative positions, said stylus being supported by said mounting structure for vibration simultaneously in two different planes, said transducer system having two relatively rigid drive links, one for each transducer element, with each drive link having a pivotal motion-transmitting connection to said stylus and a guided portion at a distance from said stylus for transmitting motion between said stylus and its transducer element, two distinct elements of said transducer system forming two relatively rigid guide links with one guide link for each drive link having a pivot portion pivotally connected to the guided portion of its drive link and a further pivot portion pivotally connected to said mounting structure, said two drive links and said two guide links constituting a link chain of at least four pivotally connected links carried by said mounting structure and operative to control and confine the motion of each drive link to a distinct direction irrespective of the amplitude of the motion transmitted therethrough between the transducer and said stylus,

*said link chain of said four links being part of an endless link chain formed of a single structure distinct from and in addition to said transducer elements,*

*a portion of said link chain disposed diametrically opposite to the stylus connection thereof being connected to said mounting structure,*

*said link chain having two opposite chain portions symmetrically spaced from the link connection to said stylus that are connected to said two transducer elements, respectively.*

[21. In a vibration transducing device as claimed in claim 20, said four pivotally connected links forming sections of a common integral link structure.]

[22. In a vibration transducing device as claimed in claim 20, said four pivotally connected links forming link sections of a common integral link structure with all links pivotally joined into an endless link chain.]

[23. In a vibration transducing device as claimed in claim 20, said four pivotally connected links forming sections of a common integral link structure, said two drive links extending in different directions from and under equal angles to the axis of the stylus.]

[24. In a vibration transducing device as claimed in claim 20, said two guide links extending in different directions relatively to and under equal angles to the axis of the stylus.]

[25. In a vibration transducing device as claimed in claim 20, said two guide links extending in different directions relatively to and under equal angles to the axis of the stylus and forming with said two drive links a chain with two pairs of parallel opposite links.

[26. In a vibration transducing device as claimed in claim 20, a portion of each of the respective two transducer elements forming one link of the link chain through which said transducer elements are connected to said stylus.]

27. In a sound-recording device, a stylus for forming a record groove in a record member, and a transducer system including at least two mechano-electric transducer elements each having a motion-transmitting connection to said stylus and operative to transmit to said stylus motions corresponding to a distinct sequence of electric signals impressed thereon, a mounting structure carrying said transducer system and said stylus in their operative positions, said stylus being supported by said mounting structure for vibration simultaneously in two different planes, said transducer system having two relatively rigid drive links, one for each transducer element, with each drive link having a pivotal motion-transmitting connection to said stylus for transmitting motion of its transducer element to said stylus and a guided portion at a distance from said stylus, two distinct elements of said transducer system forming two relatively rigid guide links with one guide link for each of the two drive links having a pivot portion pivotally connected to the guided portion of its drive link and a further pivot portion pivotally connected to said mounting structure, said two drive links and said two guide links constituting a link chain of at least four pivotally connected motion-transmitting links carried by said mounting structure and operative to confine the motion of each drive link to a distinct direction irrespective of the amplitude of motion transmitted therethrough by its transducer element to said stylus,

*said link chain of said four links being part of an endless link chain formed of a single structure distinct from and in addition to said transducer elements,*

*a portion of said link chain disposed diametrically opposite to the stylus connection thereof being connected to said mounting structure,*

*said link chain having two opposite chain portions symmetrically spaced from the link connection to said stylus that are connected to said two transducer elements, respectively.*

[28. In a phonograph pickup device as claimed in claim 8, and a connection from said mounting structure to a chain portion of said link chain which is diametrically opposite to the link-chain portion to which said stylus is connected.]

[29. In a phonograph pickup device as claimed in claim 7, said link chain having only four of said link arms joined by said arm junctions into said link chain, and a connection from said mounting structure to a chain portion of said link chain which is diametrically opposite to the link-chain portion to which said stylus is connected.]

References Cited in the file of this patent or the original patent

UNITED STATES PATENTS

| | | |
|---|---|---|
| 1,520,357 | Lord | Dec. 23, 1924 |
| 1,520,378 | Waters | Dec. 23, 1924 |
| 1,522,949 | Emerson | Jan. 13, 1925 |
| 1,773,601 | Rogers | Aug. 19, 1930 |
| 2,114,471 | Keller et al. | Apr. 19, 1938 |
| 2,879,413 | Smith-Johannsen | Mar. 24, 1959 |